(12) United States Patent
Noll et al.

(10) Patent No.: US 6,377,998 B2
(45) Date of Patent: *Apr. 23, 2002

(54) METHOD AND APPARATUS FOR PERFORMING FRAME PROCESSING FOR A NETWORK

(75) Inventors: Michael Noll, San Jose, CA (US); Michael Clarke, Oxford; Mark Smallwood, Gerearis Cross, both of (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,487

(22) Filed: Aug. 22, 1997

(51) Int. Cl.$^7$ ............................................... A01F 15/16
(52) U.S. Cl. ..................... 709/236; 709/246; 709/249; 370/401; 370/402; 370/452; 370/468; 370/389; 370/418; 370/445; 370/230; 712/228; 712/218
(58) Field of Search ......................... 395/569; 370/389, 370/401, 402, 452, 468, 445, 418, 230, 351; 375/340; 709/200, 9, 236, 246, 249; 712/228, 218

(56) References Cited

U.S. PATENT DOCUMENTS

| | | | |
|---|---|---|---|
| 5,136,580 A | * | 8/1992 | Videlock et al. ............. 370/403 |
| 5,197,064 A | | 3/1993 | Chao |
| 5,305,321 A | | 4/1994 | Crayford |
| 5,343,471 A | * | 8/1994 | Cassagnol ................. 370/85.13 |
| 5,379,289 A | | 1/1995 | DeSouza et al. |
| 5,490,252 A | | 2/1996 | Macera et al. |
| 5,491,531 A | | 2/1996 | Adams et al. |
| 5,524,250 A | * | 6/1996 | Chesson et al. ............. 395/569 |
| 5,566,178 A | | 10/1996 | Butter et al. |
| 5,724,358 A | * | 3/1998 | Headrick et al. ........... 370/418 |
| 5,812,054 A | * | 9/1998 | Bellenger ................... 370/401 |
| 5,862,338 A | | 1/1999 | Walker et al. |
| 5,909,564 A | | 6/1999 | Alexander et al. |
| 5,949,974 A | | 9/1999 | Ewing et al. |
| 5,970,069 A | * | 10/1999 | Kumar et al. ............... 370/402 |

OTHER PUBLICATIONS

"Network Commprocessor TMS380C26", Texas Instruments Incorporated, Mar. 1993.
"Ring Interface Device TMS38054", Texas Instruments Incorporated, May 1994.
"Dedicated Token Ring—Technology Overview (ThunderRING™)", Texas Instruments Incorporated, 1996.

* cited by examiner

Primary Examiner—Dung C. Dinh
Assistant Examiner—Hien C. Le
(74) Attorney, Agent, or Firm—Blakely Sokoloff Taylor & Zafman, LLP

(57) ABSTRACT

An improved frame processing apparatus for a network that supports high speed frame processing is disclosed. The frame processing apparatus uses a combination of fixed hardware and programmable hardware to implement network processing, including frame processing and media access control (MAC) processing. Although generally applicable to frame processing for networks, the improved frame processing apparatus is particular suited for token-ring networks and ethernet networks. The invention can be implemented in numerous ways, including as an apparatus, an integrated circuit and network equipment.

14 Claims, 11 Drawing Sheets

METHOD AND APPARATUS FOR PERFORMING FRAME PROCESSING FOR A NETWORK

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to data communications networks and, more particularly, to switching data frames through data communications networks.

2. Description of the Related Art

Frame processing is performed at nodes of networks, such as local area networks (LANs). By processing frames, the nodes are able to determine how to forward or switch frames to other nodes in the network.

FIG. 1 is a block diagram of a conventional frame processing apparatus 100. The conventional frame processing apparatus 100 is suitable for use in a LAN, namely a token-ring network. The conventional frame processing apparatus 100 receives data frames from a plurality of ports associated with the LAN. The data frames are processed by the conventional frame processing apparatus 100 to effectuate a switching operation. In particular, data frames received from each of the ports are processed such that they are either dropped or forwarded to other ports being serviced by the conventional frame processing apparatus 100.

The conventional frame processing apparatus 100 includes physical layer interfaces 102, 104, 106 and 108. The physical layer interfaces 102–108 individually couple to a respective port of the token-ring network. Coupled to each of the physical layer interfaces 102–108 is a token-ring chip set. In particular, token-ring chips sets 110, 112, 114 and 116 respectively couple to the physical layer interfaces 102, 104, 106 and 108. As an example, each of the token-ring chip sets 110–116 includes a TMS380C26 LAN communications processor token-ring chip as well as TMS380FPA Packet-Blaster network accelerator and TMS44400 DRAM, all of which are available from Texas Instruments, Inc. of Dallas, Tex.

Although the token-ring chip sets 110–116 could each couple to a data bus directly, to improve performance the conventional frame processing apparatus 100 may include bus interface circuits 118 and 120. The bus interface circuits 118 and 120 couple the token-ring chip sets 110–116 to a data bus 122. The bus interface circuits 118–120 transmit a burst of data over the data bus 122 for storage in a frame buffer 124. By transmitting the data in bursts, the bandwidth of the data bus 122 is able to be better utilized. A frame buffer controller 126 controls the storage and retrieval of data to and from the frame buffer 124 by way of the bus interface circuits 118 and 120 using control lines 128, 130 and 132. The frame buffer 124 stores one or more data frames that are being processed by the conventional frame processing apparatus 100.

An isolation device 134 is used to couple a bus 136 for a microprocessor 138 to the data bus 122. The microprocessor 138 is also coupled to a microprocessor memory 140 and a frame buffer controller 126. The microprocessor 138 is typically a general purpose microprocessor programmed to perform frame processing using the general instruction set for the microprocessor 138. In this regard, the microprocessor 138 interacts with data frames stored in the frame buffer 124 to perform filtering to determine whether to drop data frames or provide a switching destination for the data frames. In addition to being responsible for frame filtering, the microprocessor 138 is also responsible for low level buffer management, control and setup of hardware and network address management.

Conventionally, as noted above, the microprocessors used to perform the frame processing are primarily general purpose microprocessors. Recently, a few specialized microprocessors have been built to be better suited to frame processing tasks than are general purpose microprocessors. An example of such a microprocessor is the CXP microprocessor produced by Bay Networks, Inc. In any event, these specialized microprocessors are separate integrated circuit chips that process frames already stored into a frame buffer.

One problem with conventional frame processing apparatuses, such as the conventional frame processing apparatus 100 illustrated in FIG. 1, is that the general purpose microprocessor is not able to process data frames at high speed. As a result, the number of ports that the conventional frame processing apparatus can support is limited by the speed at which the general purpose microprocessor can perform the filtering operations. The use of specialized microprocessors is an improvement but places additional burdens on the bandwidth requirements of the data paths. Another problem with the conventional frame processing apparatus is that the data path to and from the physical layer and the frame buffer during reception and transmission of data has various bottlenecks that render the conventional hardware design inefficient. Yet another disadvantage of the conventional frame processing apparatus is that it requires a large number of integrated circuit chips. For example, with respect to FIG. 1, the bus interface circuits 118 and 120 are individually provided as application specific integrated circuits (ASICs) for each pair of ports, the token-ring chip sets 110–116 include one or more integrated circuit chips for each port, and various other chips.

Thus, there is a need for improved designs for frame processing apparatuses so that frame processing for a local area network can be rapidly performed with fewer integrated circuit chips.

SUMMARY OF THE INVENTION

Broadly speaking, the invention is an improved frame processing apparatus for a network that supports high speed frame processing. The frame processing apparatus uses a combination of fixed hardware and programmable hardware to implement network processing, including frame processing and media access control (MAC) processing. Although generally applicable to frame processing for networks, the improved frame processing apparatus is particular suited for token-ring networks and ethernet networks.

The invention can be implemented in numerous ways, including as an apparatus, an integrated circuit and network equipment. Several embodiments of the invention are discussed below.

As an apparatus for filtering data frames of a data communications network, an embodiment of the invention includes at least: a plurality of protocol handlers of the data communications network, each of the protocol handlers being associated with a port of the data communications network; and a pipelined processor to filter the data frames received by the protocol handlers as the data frames are being received. In one embodiment, the pipelined processor provides a uniform latency by sequencing through the protocol handlers with each clock cycle. Preferably, the apparatus is formed on a single integrated circuit chip.

As an integrated circuit, an embodiment of the invention includes at least a plurality of protocol handlers, each of the protocol handlers corresponding to a different communications port; a receive buffer for temporarily storing data received from the protocol handlers; framing logic, the framing logic controls the reception and transmission of data frames via the protocol handlers; and a filter processor to filter the data frames received by the protocol handlers such that certain of the data frames are dropped and other data frames are provided with a switching destination. Optionally, the integrated circuit further includes a transmit buffer for temporarily storing outgoing data to be supplied to said protocol handlers, and the filter processor further operates to filter the data frames being supplied to said protocol handlers for transmission.

As network equipment that couples to a network for processing data frames transmitted in a the network, an embodiment of the invention includes: a network processing apparatus for processing data frames received and data frames to be transmitted, a frame buffer to store the data frames received that are to be switched to other destinations in the network, and switch circuitry to switch the data frames in said frame buffer to the appropriate one or more protocol handlers. The network processing apparatus includes at least a plurality of protocol handlers, each of said protocol handlers corresponding to a different communications port of the network; and a frame processing apparatus to processes the data frames received from said protocol handlers and the data frames to be transmitted via said protocol handlers.

The advantages of the invention are numerous. One advantage of the invention is that a frame processing apparatus is able to process frames faster, thus allowing the frame processing apparatus to service more ports than conventionally possible. Another advantage of the invention is that the frame processing apparatus according to the invention requires significantly fewer integrated circuit chips per port serviced.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to an improved frame processing apparatus for a network that supports high speed frame processing. The frame processing apparatus uses a combination of fixed hardware and programmable hardware to implement network related processing, including frame processing and media access control (MAC) processing. Although generally applicable to frame processing for networks, the improved frame processing apparatus is particular suited for token-ring networks and ethernet networks.

Embodiments of the invention are discussed below with reference to FIGS. 2–10. However, those skilled in the art will readily appreciate that the detailed description given herein with respect to these figures is for explanatory purposes as the invention extends beyond these limited embodiments.

Figure 1:
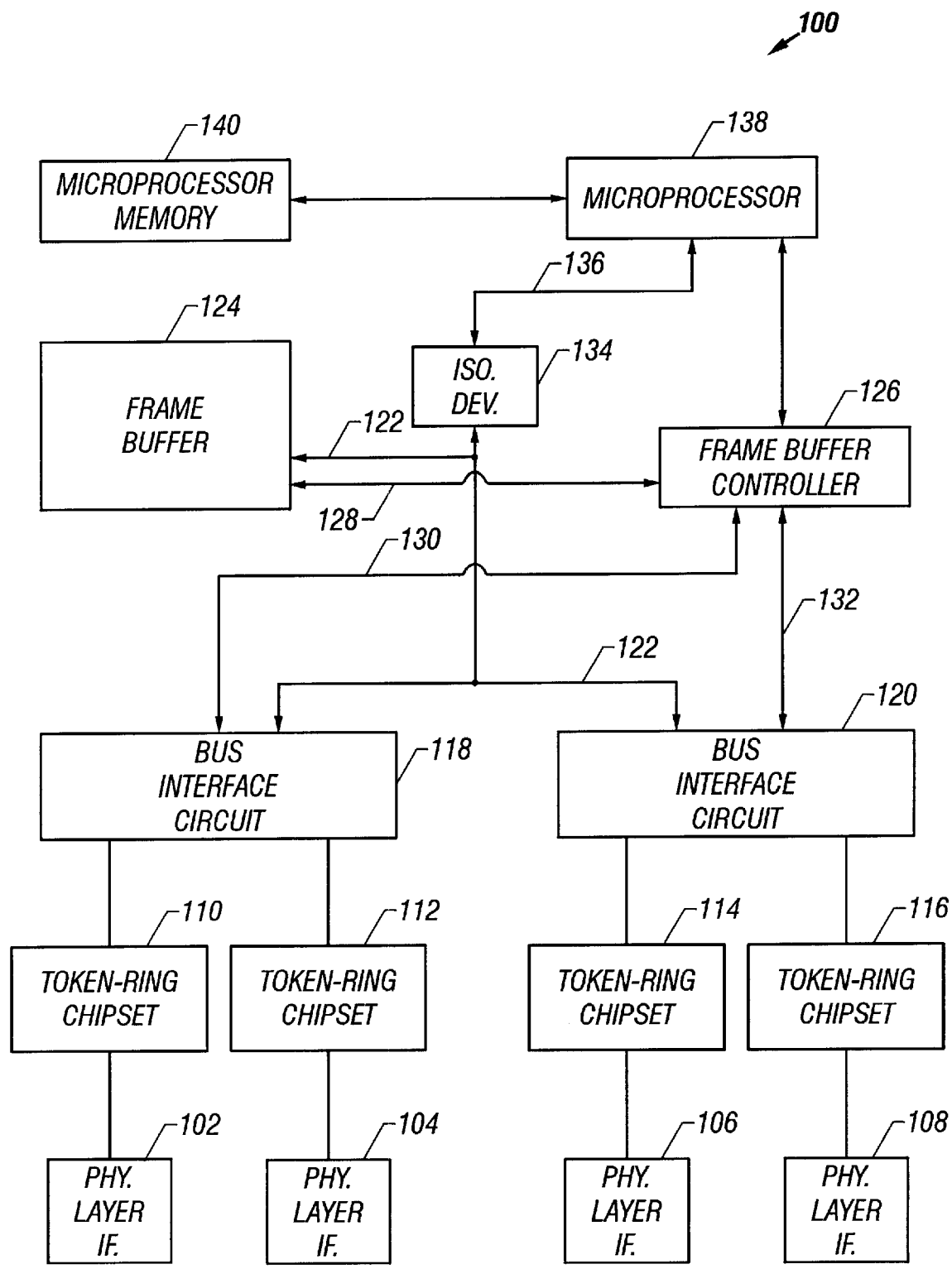
FIG. 1 is a block diagram of a conventional frame processing apparatus.
Figure 2:
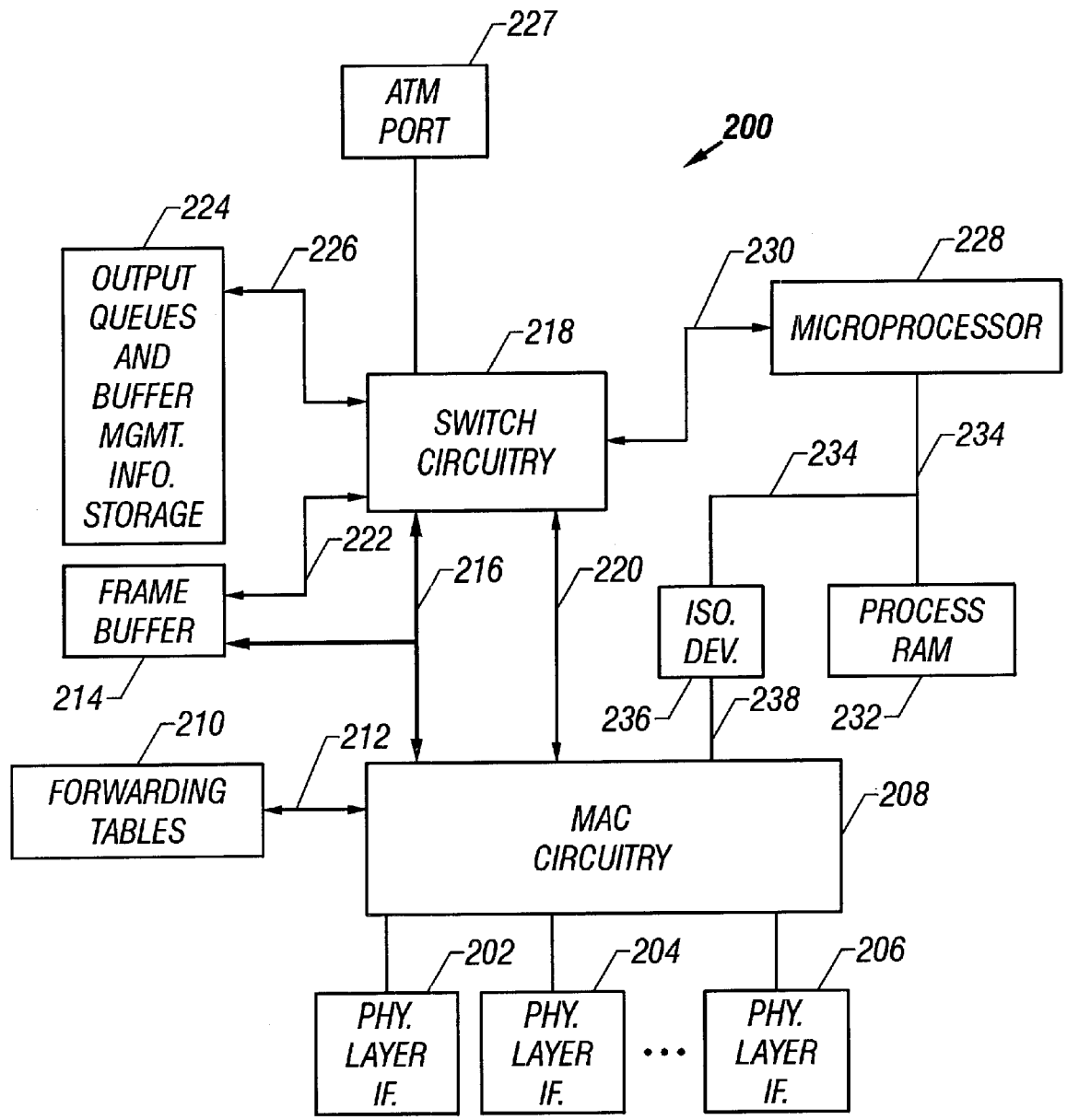
FIG. 2 is a block diagram of a frame processing apparatus according to an embodiment of the invention.

FIG. 2 is a block diagram of a frame processing apparatus 200 according to an embodiment of the invention. The frame processing apparatus 200 includes physical layer interfaces 202–206. Each of the physical layer interfaces 202–206 are associated with a port of the frame processing apparatus 200, and each port is in turn coupled to a node of a network. The network may be a local area network (LAN). Examples of LANs include token-ring networks and ethernet networks. Each of the physical layer interfaces 202–206 also couple to media access controller (MAC) circuitry 208. The MAC circuitry 208 performs media access control operations and filtering operations on the data frames being processed by the frame processing apparatus 200. In one embodiment, the MAC circuitry 208 is itself an integrated circuit chip. The details on the construction and operation on the MAC circuitry 208 are discussed in detail below with respect to FIGS. 3A–9.

The MAC circuitry 208 couples to forwarding tables 210 by way of a table bus 212. The forwarding tables 210 store information such as destination addresses, IP addresses, VLAN or bridge group information which are used by the MAC circuitry 208. The forwarding tables 210 are coupled to the MAC circuitry 208 through a bus 212. Additional details on the forwarding tables 210 are provided in FIG. 8 below.

During reception, the MAC circuitry 208 receives incoming data frames, and then filters and processes the incoming data frames. The processed data frames are then stored in a frame buffer 214. During transmission, the MAC circuitry 208 also receives the processed data frames from the frame buffer 214, filters and forwards them to the appropriate nodes of the network. Hence, the MAC circuitry 208 is capable of performing both receive side filtering and transmit side filtering.

The frame buffer 214 is coupled to the MAC circuitry 208 through a data bus 216. The data bus 216 also couples to switch circuitry 218. The data frames stored in the frame buffer 214 by the MAC circuitry 208 have normally been filtered by the MAC circuitry 208. The switch circuitry 218 is thus able to retrieve the data frames to be switched from the frame buffer 214 over the data bus 216. The switch circuitry 218 performs conventional switching operations, such as level-2 and level-3 switching. The switch circuitry 218 and the MAC circuitry 208 send and receive control signals over a control bus 220. A control bus 222 is also used to communicate control signals between the frame buffer 214 and the switch circuitry 218. The switch circuitry 218 is further described with respect to FIG. 10 below.

The frame processing apparatus 200 further includes output queues and buffer management information storage 224. The output queues and buffer management information storage 224 is coupled to the switch circuitry 218 over a bus 226. The switch circuitry 218 monitors the output queues and buffer management information storage 224 to determine how to manage its switching operations. In addition, the frame processing apparatus 200 may further include an ATM port 227 that is coupled to the switch circuitry 218 and thus coupled to the frame buffer 214 and the output queues and buffer management information storage 224.

A microprocessor 228 is also coupled to the switch circuitry over bus 230 to assist with operations not directly associated with the reception and transmission of data frames. For example, the microprocessor 228 performs configuration of the MAC circuitry 208 during initialization, gathering statistical information, etc. The microprocessor 228 is coupled to a processor random-access memory (RAM) 232 over a processor bus 234. The processor RAM 232 stores data utilized by the microprocessor 228. The MAC circuitry 208 is also operatively coupled to the processor bus 234 by an isolation device 236 and an interconnect bus 238.

Figure 3A:
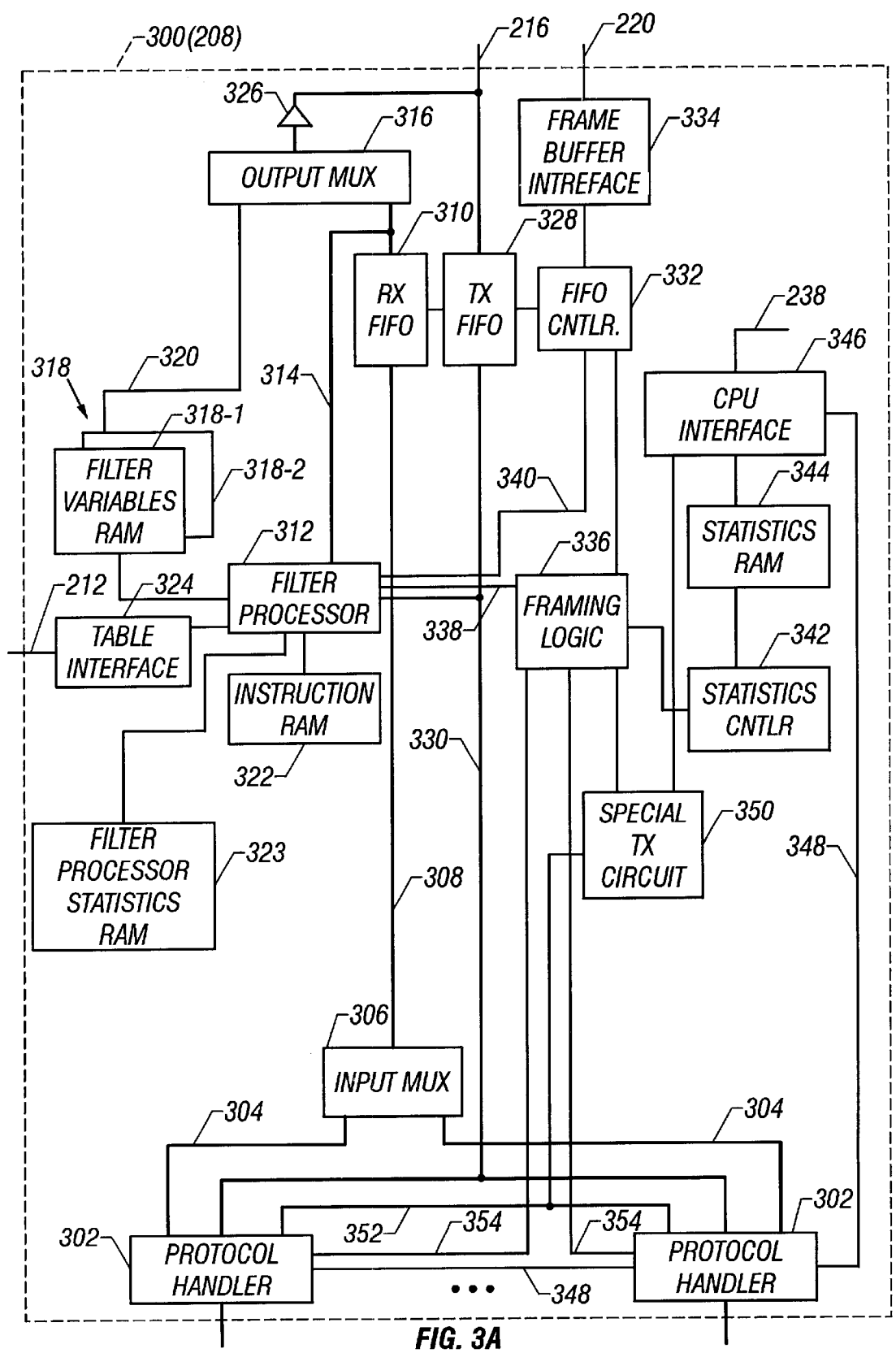
FIG. 3A is a block diagram of MAC circuitry according to an embodiment of the invention.

FIG. 3A is a block diagram of MAC circuitry 300 according to an embodiment of the invention. The MAC circuitry 300, for example, may be the MAC circuitry 208 illustrated in FIG. 2.

The MAC circuitry 300 includes a plurality of protocol handlers 302. The protocol handlers 302 couple to physical layer interfaces and individually receive and transmit data over the physical media of the network coupled to the physical layer interfaces. A received data bus 304 couples the protocol handlers 302 to an input multiplexer 306. The input multiplexer 306 is in turn coupled to a receive FIFO 310 through receive bus 308. Hence, data being received at one of the protocol handlers 302 is directed along a receive data path consisting of the received data bus 304, the input multiplexer 306, the receive bus 308, and the receive FIFO 310.

The protocol handlers 302 preferably implement in hardware those features of the 802.5 specification for the MAC layer that need to be implemented in hardware, the remaining other features of the MAC layer are left to software (i.e., hardware programmed with software). For example, the protocol handlers 302 incorporate hardware to perform full repeat path, token generation and acquisition, frame reception and transmission, priority operation, latency buffer and elasticity buffer. In addition, various timers, counters and policy flags are provided in the protocol handlers 302. The balance of the MAC layer functions are performed in software in other portions of the MAC circuitry 300 (i.e., by the filter processor) or by the microprocessor 228.

A filter processor 312 is coupled to the receive FIFO 310 through a processor bus 314. The processor bus 314 is also coupled to an output multiplexer 316. The output multiplexer 316 is also coupled to a filter variables RAM 318 over a filter variables bus 320. The filter variables RAM 318 also couples to the filter processor 312 to provide filter variables to the filter processor 312 as needed. In one embodiment, the filter variables RAM 318 includes a receive filter variables RAM 318-1 for use by the filter processor 312 during receiving of frames and a transmit filter variables RAM 318-2 for use by the filter processor 312 during transmission of frames.

In order to accomplish sophisticated level-2 switching in hardware (i.e., with user level filters, bridge groups, VLANs, etc.) at wire speed as well as level-3 switching, significant amounts of frame processing must be performed by the frame processing apparatus 200. Although frame processing could be implemented in hardwired logic, such an approach would be unreasonable given the complexities of the frame processing. The filter processor 312 within the MAC circuitry 208 is a programmable solution to the problem. The filter processor 312 can be implemented by a small core of logic (e.g., less than 15K gates) that can be dynamically programmed. The filter processor 312 preferably forms an execution pipeline that executes instructions over a series of stages. The instruction set is preferably small and tailored to frame examination operations. A received frame being processed has an execution context where each frame contains its own set of operating variables. In other words, the filter processor 312 is specialized for performing frame processing operations in a rapid and efficient manner in accordance with directions provided by program instructions.

In general, the filter processor 312 performs filter processing and other processing associated with forwarding frames. Each frame must be processed extensively to determine frame destinations. This includes extracting the frame destination address (DA) and looking it up in the forwarding tables 210. Additionally, other fields may be attached to the destination address (DA) for context specific lookups. As an example, this could include VLAN or bridge group information. For layer-3 functionality, IP addresses can be extracted and passed through the forwarding tables 210. In general, the filter processor 312 allows up to two arbitrary fields in either the received frame or variable memory to be concatenated and sent through the forwarding tables 210. Furthermore, many frame fields must be compared against specific values or decoded from a range of values. The filter processor 312 preferably allows single instruction methods of comparing and branching, comparing and storing (for building complex Boolean functions), and lastly range checking, branching or storing. Customer configured filters can also be performed through this processing logic. Custom configured filters are, for example, used for blocking traffic between particular stations, networks or protocols, for monitoring traffic, or for mirroring traffic.

In one embodiment, the filter variables RAM 318 is a 128×64 RAM that holds 64 bytes of variables for each port. The filter variables RAM 318 is preferably a dual port RAM where both the read and write ports are used by the filter processor 312. The first 64 bytes of variables for a port are always written out to the frame buffer 214 with a status write for each frame processed by the filter processor 312. The status write thus contains the control information that results from the frame processing. As an example, the control information includes beginning location and ending location within the frame buffer 214, status information (e.g., CRC error, Rx overflow, Too long, Alignment error, Frame aborted, Priority), a forwarding map, and various destinations for the frame. The remaining 32 bytes can be written by request of the filter processor 312. This allows software or external routing devices easy access to variables that can be used to store extracted data or Boolean results in a small collected area. Instructions should not depend on initialized values for any variable as the RAM entries are re-used on a frame basis and thus will start each frame initialized to the values written by the last frame. Note that many variables have a pre-defined function that is used by the switch circuitry 218 for forwarding frames.

The microprocessor 228 is able to read or write any location in the filter variables RAM 318. Generally, the microprocessor 228 reads information from the filter variables RAM 318 for diagnostic purposes. It can, however, be used by functional software in order to pass in parameters for a port that are fixed from frame to frame but programmable during the lifetime of a port. Examples of this include the spanning tree state (blocked or not blocked).

The filter variables RAM 318 may also be double buffered. In one embodiment, there are two 64 byte areas per port, and alternate frames received for a port re-use a given 64 byte area. As a result, frame processing can begin on a subsequent frame while the buffer system is still waiting to unload the previous frame's variables. This is an important point for software since port control parameters must be written to both areas.

In one embodiment, the filter variables RAM 318 also contains status registers for each port. The status registers are updated with the progress of the processing of each frame. Status information in the status registers is primarily for the benefit of the filter processor 312. The status registers are normally written by the protocol handlers 302 but can also be updated by the filter processor 312.

An instruction RAM 322 is also coupled to the filter processor 312 to supply the instructions to be executed by the filter processor 312. The instruction RAM 322 stores the instructions executed by the filter processor 312. The instructions are written to the instruction RAM 322 by the microprocessor 228 and read from the instruction RAM 322 by the filter processor 312. For example, in one embodiment having 64-bit instruction words, the instruction RAM 322 can be a 512×64 RAM having a single port. All ports of the frame processing apparatus 200 share the same instruction set for the processing carried out by the filter processor 312. Also, with each port having a unique variable space within the filter variables RAM, the filter processor 312 is able to support execution specific to a port or group of ports. Grouping of ports is, for example, useful to form subnetworks within a network.

Further, a table interface 324 provides an interface between the forwarding tables 210 and the filter processor 312. The forwarding tables 210 store destination addresses, IP addresses, VLAN or bridge group information which are used by the filter processor 312 in processing the frames. Additional details on the table interface are described below with reference to FIG. 8.

A buffer 326 receives the output data from the output multiplexer 316 and couples the output data to the data bus 216. In addition to being coupled to the buffer 326, the data bus 216 is coupled to a transmit FIFO 328. The output of the transmit FIFO 328 is coupled to a transmit bus 330 which is coupled to the protocol handlers 302 and the filter processor 312. The transmit data path through the MAC circuitry 300 consists of the data bus 216, the transmit FIFO 328, and the transmit bus 330.

The MAC circuitry 300 further includes a FIFO controller 332 for controlling the receive FIFO 310 and the transmit FIFO 328. The FIFO controller 332 couples to the control lines 220 through a frame buffer interface 334. The FIFO controller 332 additionally couples to framing logic 336 that manages reception and transmission of frames. The framing logic 336 is coupled to the filter processor 312 over control line 338, and the FIFO controller 332 is coupled to the filter processor over control line 340. The framing logic 336 further couples to a statistics controller 342 that controls the storage of statistics in a statistics RAM 344. Exemplary statistics are provided in Table 1 below.

The data is streamed to and from the frame buffer 214 through the FIFOs 310, 328 for providing latency tolerance. The frame buffer interface 334 handles the unloading of data from the receive FIFO 310 and writing the unloaded data to the frame buffer 214. The frame buffer interface 334 also handles the removal of data to be transmitted from the frame buffer 214 and the loading of the removed data into the transmit FIFO 328. The output queues and buffer management information storage 224 is used to perform buffer address management.

In one embodiment, whenever a block of data in the receive FIFO 310 is ready for any of the ports, the frame buffer interface 334 generates a RxDATA request to the switch circuitry 218 for each ready port. Likewise, whenever the transmit FIFO 328 has a block of space available for any port, the frame buffer interface 334 generates a TxDATA request to the switch circuitry 218. Buffer memory commands generated by the switch circuitry 218 are received and decoded by the frame buffer interface 334 and used to control burst cycles into and out of the two FIFOs 310, 328.

The framing logic 336 tracks frame boundaries for both reception and transmission and controls the protocol handler side of the receive and transmit FIFOs 310, 328. On the receive side, each time a byte is ready from the protocol handler 302 it is written into the receive FIFO 310, and the framing logic 336 keeps a count of valid bytes in the frame. In one embodiment, this count lags behind by four bytes in order to automatically strip the FCS from a received frame. In this case, an unload request for the receive FIFO 310 will not be generated until a block of data (e.g., 32 bytes) is known not to include the FCS. Each entry in the receive FIFO 310 may also include termination flags that describe how much of a word (e.g., 8 bytes) is valid as well as marks the end of frame. These termination flags can be used during unloading of the receive FIFO 310 to properly generate external bus flags used by the switch circuitry 218. Subsequently received frames will be placed in the receive FIFO 310 starting on the next block boundary (e.g., next 32 byte boundary). This allows the switch circuitry 218 greater latency tolerance in processing frames.

On the transmit side, the protocol handler 302 is notified of a transmission request as soon as a block of data (e.g., 32 bytes) is ready in the transmit FIFO 328. As with the receive side, each line may include termination flags that are used to control the end of frame. The protocol handler 302 will automatically add the proper FCS after transmitting the last byte. Multiple frames may be stored in the transmit FIFO 328 in order to minimize inter-frame gaps. In one embodiment, each port (channel) serviced by the frame processing apparatus 200 has 128 bytes of storage space in the FIFOs 310, 328. Up to two (2) frames (of 64 bytes) can be simultaneously stored in each of the FIFOs 310, 328. Preferably, data is moved in bursts of four 64 bit wide cycles. This allows the reception of the data stream to have better tolerance to inter-packet allocation latencies and also to provide the ability to transmit on successive tokens at minimum Inter Frame Gaps (IFGs). Status information is sent from the framing logic 336 to external logic indicating availability of received data, or transmit data, as well as received status events.

The transmit FIFO 328 may have a complication in that data can arrive from the frame buffer 214 unpacked. This can happen when software modifies frame headers and links fragments together. In order to accommodate this, the frame buffer interface 334 may include a data aligner that will properly position incoming data based on where empty bytes start in the transmit FIFO 328. Each byte is written on any boundary of the transmit FIFO 328 in a single clock.

In one embodiment, the receive FIFO 310 is implemented as two internal 128×32 RAMs. Each of the eight ports of the frame processing apparatus 200 is assigned a 16×64 region used to store up to four blocks. Frames start aligned with 32 byte blocks and fill consecutive memory bytes. The receive FIFO 310 is split into two RAMs in order to allow the filter processor 312 to fetch a word sized operand on any arbitrary boundary. To accommodate this, each RAM half uses an independent read address.

Because of the unaligned write capability, the transmit FIFO 328 is slightly more complex. It is made of two 64×64 RAMs together with two 64×4 internal RAMs. The 64×64 RAMs hold the data words as received from the frame buffer 214 while the 64×4 RAMs are used to store the end of frame (EOF) flag together with a count of how many bytes are valid in the data word. Assuming data arrived aligned, each double-word of a burst would write to an alternate RAM. By using two RAMs split in this fashion, arbitrarily unaligned data can arrive with some portion being written into each RAM simultaneously.

The statistics RAM 344 and the filter processor statistics RAM 323 are responsible for maintaining all per port statistics. A large number of counters are required or at least desired to provide Simple Network Management Protocol (SNMP) and Remote Monitor (RMON) operations. These particular counters are preferably maintained in the statistics RAM 344. Also, the microprocessor 228 is able to read the statistics at any point in time through the CPU interface 346.

In one embodiment, a single incrementer/adder per RAM is used together with a state machine to process all the counters stored in the statistics RAM 344. Statistics generated by receive and transmit control logic are kept in the statistics RAM 344. In one embodiment, the statistics RAM 344 is a 128×16 RAM (16 statistics per port) and are all 16 bits wide except for the octet counters which are 32 bits wide and thus occupy two successive memory locations. The microprocessor 228 is flagged each time any counter reaches 0xC00, at which point it must then read the counters.

Table 1 below illustrates representative statistic that can be stored in the statistics RAM 344. In order to limit the number of counters that must be affected per frame, frames will be classified first into groups and then only one counter per group will be affected for each frame. For example, a non-MAC broadcast frame properly received without source routing information will increment a counter storing a count for a DataBroadcastPkts statistic only. Hence, in this example, to count the total number of received frames, the microprocessor 228 has to add the DataBroadcastPkts, AllRoutesBroadcastPkts, SingleRoutesBroadcastPkts, InFrames, etc. Normally, statistics are only incremented by one, except for the octet counters where the size is added to the least significant word and the overflow (if any) increments the most significant word. An additional configuration bit per port may be used to allow the receive statistics to be kept for all frames seen on the ring or only for frames accepted by the port.

TABLE 1

| Grp | Statistic | Purpose |
| --- | --- | --- |
| A | RxOctet hi | Received octets in non-error frames except through octets |
| A | RxOctet lo | Received octets in non-error frames except through octets |
| A | RxThruOctet hi | Received octets in non-error source routed frames where this ring is not terminal ring |
| A | RxThruOctet lo | Received octets in non-error source routed frames where this ring is not terminal ring |
| A | TxOctet hi | Transmitted octets |
| A | TxOctet lo | Transmitted octets |
| B | RxPktUnicast | Received unicast LLC frames wo/ RIF or w/ RIF and directed |
| B | RxPktGrpcast | Received groupcast LLC frames wo/ RIF or w/ RIF and directed |
| B | RxPktBroad | Received broadcast LLC frames wo/ RIF or w/ RIF and directed |
| B | RxPktThrough | Received LLC source routed directed frames passed through switch |
| B | TxPktUnicast | Transmitted unicast LLC frames |
| B | TxPktGrpcast | Transmitted groupcast LLC frames |
| B | TxPktBroad | Transmitted broadcast LLC frames |
| C | RxFPOver | Receive frame dropped, filter processor busy on previous frame |
| C | RxFIFOOver | Receive frame dropped, RxFIFO overflow |
| C | TxFIFOUnder | Transmit frame dropped, TxFIFO underflow |

Statistics generated by the filter processor 312 are kept in the filter processor statistics RAM 323. In one embodiment, the filter processor statistics RAM 323 is a 512×16 RAM for storage of 64 different 16 bit counts for each port. These statistics can be used for counting complex events or RMON functions. The microprocessor 228 is flagged each time a counter is half full, at which point it must then read the counters.

The frame processing apparatus 200 also provides an interface to the microprocessor 228 so as to provide the microprocessor 228 with low-latency access to the internal resources of the MAC circuitry 208. In one embodiment, a CPU interface 346 interfaces the MAC circuitry 300 to the microprocessor 228 via the interconnect bus 238 so that the microprocessor 228 has access to the internal resources of the frame processing apparatus 200. Preferably, burst cycles are supported to allow software to use double-word transfers and block cycles. The microprocessor 228 is also used to read and write control registers in each of the protocol handlers 302 to provide control of ring access as well as assist with the processing of the MAC frames. Also, by providing the microprocessor 328 with access to the internal resources, the microprocessor 228 can perform diagnostics operations. The CPU interface 346 can also couple to the forwarding tables 210 so as to provide initialization and maintenance.

The CPU interface 346 further couples to the protocol handlers 302 and a special transmit circuit 350. The special transmit circuit 350 couples to the protocol handlers 302 over bus 352. Moreover, the protocol handlers 302 couple to the framing logic 336 over control lines 354.

The special transmit circuit 350 operates to transmit special data, namely high priority MAC frames. The special transmit circuit 350 is used within the MAC circuitry 300 to transmit high priority frames without having to put them through the switch circuitry 218. As part of the ring recovery process, certain MAC frames (e.g., beacon, claim and purge) must be transmitted immediately, and thus bypass other frames that are queued in the switch circuitry 218. Also, for successful ring poll outcomes on large busy rings, certain high-priority MAC frames (i.e., AMP and SMP) are transmitted without being blocked by lower priority frames queued ahead of them in the output queues 224.

The special transmit circuit 350 includes an internal buffer to store an incoming high priority frame. In one embodiment, the internal buffer can store a block of 64 bytes of data within the special transmit circuit 350. The MAC processing software (microprocessor 228) is notified when a frame is stored in the internal buffer and then instructs the internal buffer to de-queue the frame to the protocol handler 302 for transmission. The MAC processing software thereafter polls for completion of the transmission and may alternatively abort the transmission. The special transmit circuit 350 may also be written by the microprocessor 228 via the CPU interface 346.

Figure 3B:
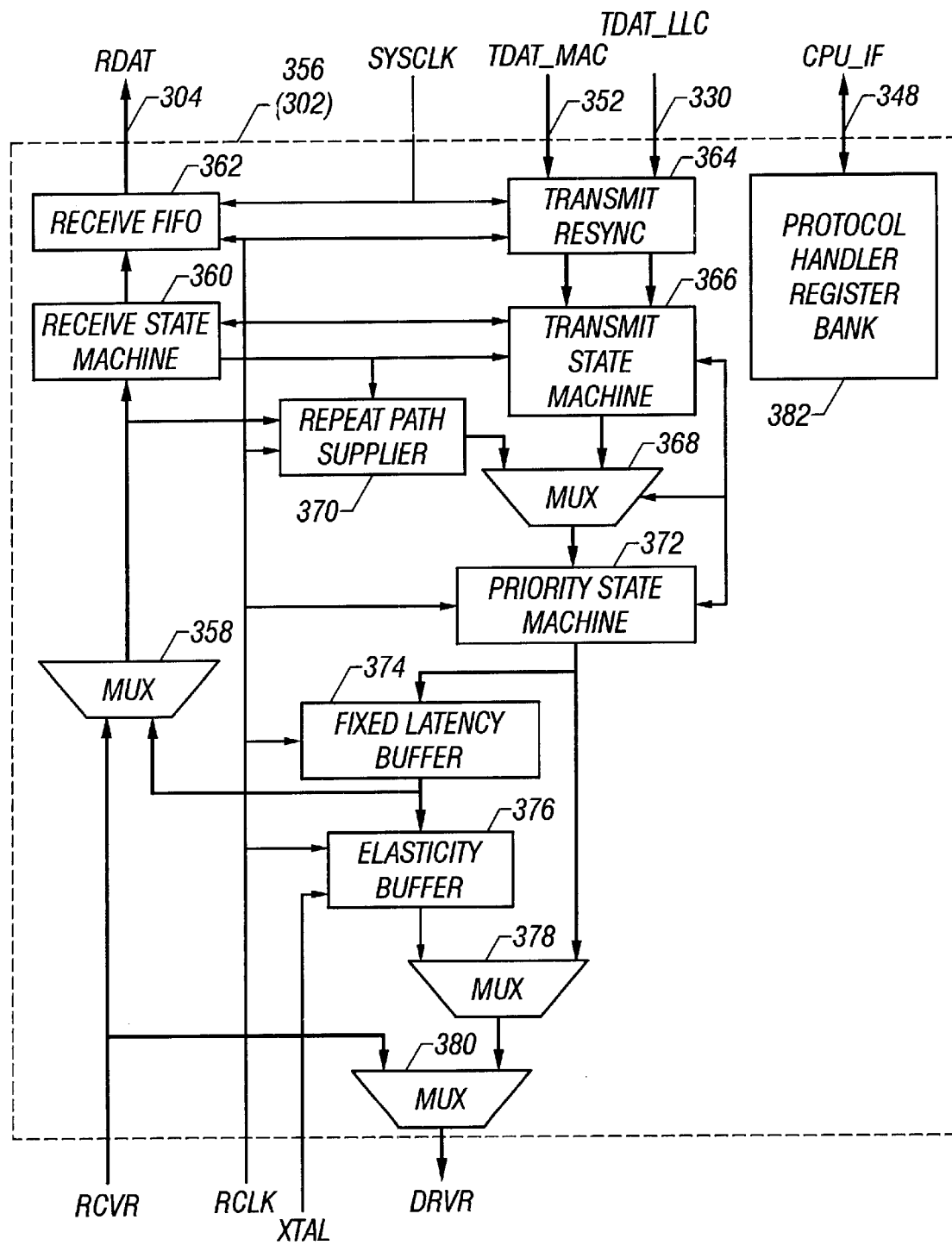
FIG. 3B is a block diagram of a protocol handler according to an embodiment of the invention.

FIG. 3B is a block diagram of a protocol handler 356 according to an embodiment of the invention. The protocol handler 356 is, for example, an implementation of the protocol handler 302 illustrated in FIG. 3.

The protocol handler 356 implements physical signaling components (PSC) section and certain parts of the MAC Facility section of the IEEE 802.5 specification. In the case of token ring, the protocol handler 356 converts the token ring network into receive and transmit byte-wide data streams and implements the token access protocol for access to the shared network media (i.e., line). Data being received from a line is received at a local loopback multiplexer 358 which forwards a selected output to a receive state machine 360. The receive state machine 360 contains a de-serializer to convert the input stream into align octets. The primary output from the receive state machine 360 is a parallel byte stream that is forwarded to a receive FIFO 362. The receive state machine 360 also detects errors (e.g., Manchester or CRC errors) for each frame, marks the start of the frame, and initializes a symbol decoder and the de-serializer. Further, the receive state machine 360 parses the input stream and generates the required flags and timing markers for subsequent processing. Additionally, the receive state machine 360 detects and validates token sequences, namely, the receive state machine 360 captures the priority field (P) and reservation field (R) of each token and frame and presents them to the remaining MAC circuitry 300 as current frame's priority field (Pr) and current frame's reservation field (Rr). The receive FIFO 362 is a FIFO device for the received data and also operates to re-synchronize the received data to a main system clock.

The protocol handler 356 also has a transmit interface that includes two byte-wide transmit channels. One transmit channel is used for MAC frames and the other transmit channel is used for LLC frames (and some of the management style MAC frames). The LLC frames are supplied over the transmit bus 330 from the switch circuitry 218. The MAC frames are fed from the special transmit circuitry 350 over the bus 352. These two transmit channels supply two streams of frames to a transmit re-synchronizer 364 for synchronization with the main system clock. The re-synchronized transmit signals for the two streams are then forwarded from the transmit re-synchronizer 364 to a transmit state machine 366.

The transmit state machine 366 multiplexes the data from the two input streams by selecting the data from the bus 352 first and then the data from the bus 330. The transmit state machine 366 controls a multiplexer 368 to select either one of the input streams supplied by the transmit state machine 366 or repeat data supplied by a repeat path supplier 370. While waiting for the detection of a token of the suitable priority, the transmit state machine 366 causes the multiplexer 368 to output the repeat data from the repeat path supplier 370. Otherwise, when the transmit state machine 366 detects a token with the proper priority, the transmit state machine 366 causes the multiplexer 368 to output frame data to be transmitted, and at the end of each frame, inserts a frame check sequence (FCS) and ending frame sequence (EFS), and then transmits the inter frame gap (IFG) and a token. The transmit state machine 366 is also responsible for stripping any frame that it has put on the token-ring network. The stripping happens in parallel with transmission and follows a procedure defined in the 802.5 specification. As suggested in the 802.5 specification, under-stripping is avoided at the expense of over-stripping.

The output of the multiplexer 368 is supplied to a priority state machine 372. The priority state machine 372 implements the 802.5 specification priority stacking mechanism. For example, when priority stacking is in use, i.e., when the priority of the token is raised, the repeat path is delayed by up to eight (8) additional bits. Once the priority stacking is no longer in use, the priority delay is removed.

The output of the priority state machine 372 is forwarded to a fixed latency buffer 374 that, for example, inserts a fixed latency of a predetermined number of bits (e.g., 24 bits) to ensure that a token can circulate around the token-ring. The output from the fixed latency buffer 374 is supplied to an elasticity buffer 376 as well as to the loopback multiplexer 358 for loopback purposes. The elasticity buffer 376 provides a variable delay for clock rate error tolerance.

The output of the priority state machine 372 as well as the output of the elasticity buffer 376 are supplied to a multiplexer 378. The data stream to be transmitted from either the priority state machine 372 or the delayed version from the elasticity buffer 376 are then provided to a wire-side loopback multiplexer 380. The wire-side loopback multiplexer 380 also receives the input data stream when a loopback is desired. The wire-side loopback multiplexer 380 couples to one of the physical layer interfaces 202–206 and outputs either the output from the multiplexer 378 or the input data stream for loopback. The protocol handler 356 also includes a protocol handler register bank 382 that includes various control registers.

Since the frame processing apparatus 200 can support several connection modes (e.g., direct attachment, station, RI/RO expansion), functionality at power-up and during insertion have configurable deviations from the specification. First, direct attachment and RI/RO expansion require that the frame processing apparatus 200 repeat data at all times. The protocol handler 356 includes a wire-side loopback path implemented by the wire-side loopback multiplexer 380 for this purpose. This situation allows for accurate detection of idle rings (based on detecting lack of valid Manchester coding), instead of depending on the crude energy detect output from the physical layer interfaces 202–206. In addition, the normal initialization process of sending loop-media test frames is not applicable when connectivity has been ascertained prior to any insertion attempt. As such, this step of the initialization can be eliminated for all attachment modes besides station. For applications where the lobe testing is desirable or required, normal station attachment for RI/RO where phantom drive is generated can be utilized.

Each frame of data that is received is processed through the filter processor 312 to determine whether or not the frame should be accepted by the port and forwarded. The filter processor 312 is preferably implemented by specialized general purpose hardware that processes programmed filtering instructions. Embodiments of the specialized general purpose hardware are described in detail below with reference to FIGS. 4 and 5.

In processing a frame of data, the filter processor 312 can execute a plurality of instructions (e.g., up to 512 instructions). Each instruction is capable of extracting fields from the frame of data and storing them in a storage device (i.e., the filter variables RAM 318). Likewise, frame fields can be compared against immediate values and the results of comparisons stored in the filter variables RAM 318. Lastly, fields can be extracted, looked up in the forwarding tables 210 and the results stored in the filter variables RAM 318. Each port also includes some number of control registers that are set by the microprocessor 228 and can be read by the filter processor 312 during execution of the filtering instructions. For example, these control registers are typically used to store virtual ring (VRING) membership numbers, source routing ring and bridge numbers, etc.

The execution of filtering instructions by the filter processor 312 is generally responsible for two major functions. First, the filter processor 312 must determine a destination mask and BP DEST (backplane destination) fields used by the switch circuitry 218 for forwarding the frame. Second, the filter processor 312 must determine whether or not to accept the frame in order to properly set the AR (address recognized) and FC (frame copied) bits in the FS (frame status) field.

While the filter processor 312 is processing a current frame, subsequent frame are placed in the receive FIFO 310. The processing time for the current frame thus should complete before the receive FIFO 310 is filled because when the receive FIFO 310 overflows frames are dropped. For the AR/FC function, all instructions that determine the acceptance of a frame must finish executing before the FS byte is copied off of the wire, else the previous settings will be used. In order to help the instructions to complete in time, execution is preferably scheduled as soon as the frame data that an instruction depends on arrives. As an example, the filter processor 312 can allow all required instructions to complete before or during the reception of the CRC. Also, it is sufficient to provide the filter processor 312 with a single execution unit to supports all of the ports of the frame processing apparatus 200, particularly when the ports are serviced in a round robin fashion as discussed below.

The filter processor 312 also performs transmit side filtering. To reduce circuitry, the same execution unit that performs the receive side filtering can perform the transmit side filtering while the reception side is idle. For half-duplex operation the use of the single execution unit should provide acceptable; however, for full duplex operation a second execution unit is provided to perform the transmit side filtering.

Additionally, the filter processor 312 operates to perform RIF scanning required to forward source routed frames. For each received frame of data that has a RIF, circuitry in the framing logic 336 operates to scan this field looking for a match between the source ring and bridge and an internal register. If a match is found the destination ring is extracted and placed in a register visible to the filter processor 312. Thereafter, the destination ring stored in the register can be used to index a table within the forwarding tables 210.

Figure 4:
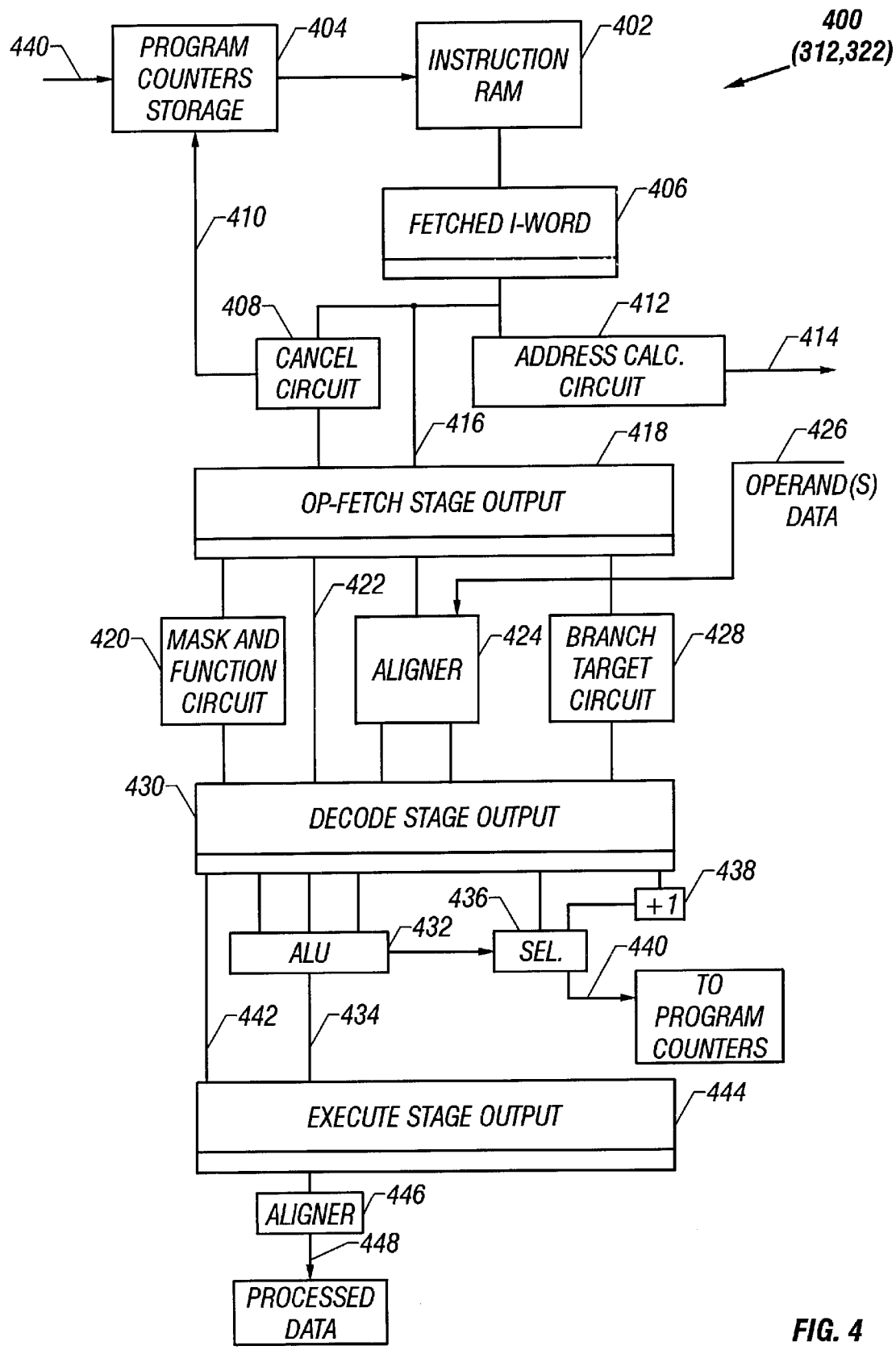
FIG. 4 is a block diagram of a filter processor according to an embodiment of the invention.

FIG. 4 is a block diagram of a filter processor 400 according to an embodiment of the invention. Even though the filter processor is a high speed pipelined processor, the circuitry implementing the filter processor 400 is minimal and compact so as to fit within the MAC circuitry 208. The filter processor 400 is one embodiment of the filter processor 312 together with the RAM 322 illustrated in FIG. 3. The filter processor 400 has five (5) distinct pipeline stages. Generally, the stages are described as instruction fetch, operand fetch, decode, execute and write.

In the first (instruction fetch) stage of the filter processing pipeline, the filter processor 400 retrieves an instruction to be next executed. More particularly, the instruction is retrieved from an instruction RAM 402 using a program counter obtained from a program counters storage 404. The program counters storage 404 stores a program counter for each of the protocol handlers 302 being serviced by the MAC circuitry 300. The instruction retrieved or fetched from the instruction RAM 402 is then latched in a fetched instruction word (I-word) register 406. This completes the first stage of the filter processing pipeline.

In the next (operand fetch) stage of the filter processing pipeline, a cancel circuit 408 produces a cancel signal 410 to notify the program counters storage 404 to activate a wait counter for the particular protocol handler 302 being serviced. The wait counter provides a waiting period during which processing for the protocol handler 302 currently being processed in this stage of the processing pipeline undergoes no processing during the wait period. This stage also includes an address calculation circuit 412 to calculate one or more addresses 414 used to access stored data in a memory storage device or devices. An operand fetch (op-fetch) output register 418 stores various data items that are determined in or carried-through 416 the operand fetch stage of the filter processing pipeline.

In the next (decode) stage of the processing pipeline, the instruction is decoded, a mask is produced, a function may be produced, the fetched operands may be aligned, and a branch target may be determined. In particular, a mask and function circuit 420 produces preferably a mask and a function. The mask will be used to protect data in a word outside the active field. A carry-through link 422 carries through the decode stage various data items from the operand fetch output register 418. An aligner 424 receives the one or more operands from the data storage device or devices over a link 426 and possibly data from the operand fetch output register 418. The aligner 424 then outputs one or more aligned operands. A branch target circuit 428 determines a branch target for certain instructions. A decode stage output register 430 stores the items produced by the decode stage, namely, the mask, function, carry through data, aligned operands, branch target, and miscellaneous other information.

In the next (execute) stage, an arithmetic logic unit (ALU) 432 performs a logical operation on the aligned operands and possibly the function and produces an output result 434. The ALU 432 also controls a selector 436. The selector 436 selects one of the branch target from the decode stage output register 430 and a program counter after having been incremented by one via an adder 438, to be output as a next program counter 440. The next program counter 440 is supplied to the program counter storage 404 to update the appropriate program counter stored therein. The output result 434 and carry through data 442 are stored in an execute stage output register 444 together with other miscellaneous information.

In the last (write) stage of the filter processing pipeline, an aligner 446 aligns the output result 434 obtained from the execute state output register 444 to produce an aligned output result 448 known as processed data. The processed data is then written to a determined location in the memory storage device or devices.

The filter processor 400 services the protocol handlers 302 in a round robin fashion. In particular, with each clock cycle, the filter processor 400 begins execution of an instruction for a different one of the protocol handlers 302. By this approach, the processing resources of the filter processor 400 are distributed across the ports requiring service so that certain ports do not monopolize the processing resources.

Figure 5:
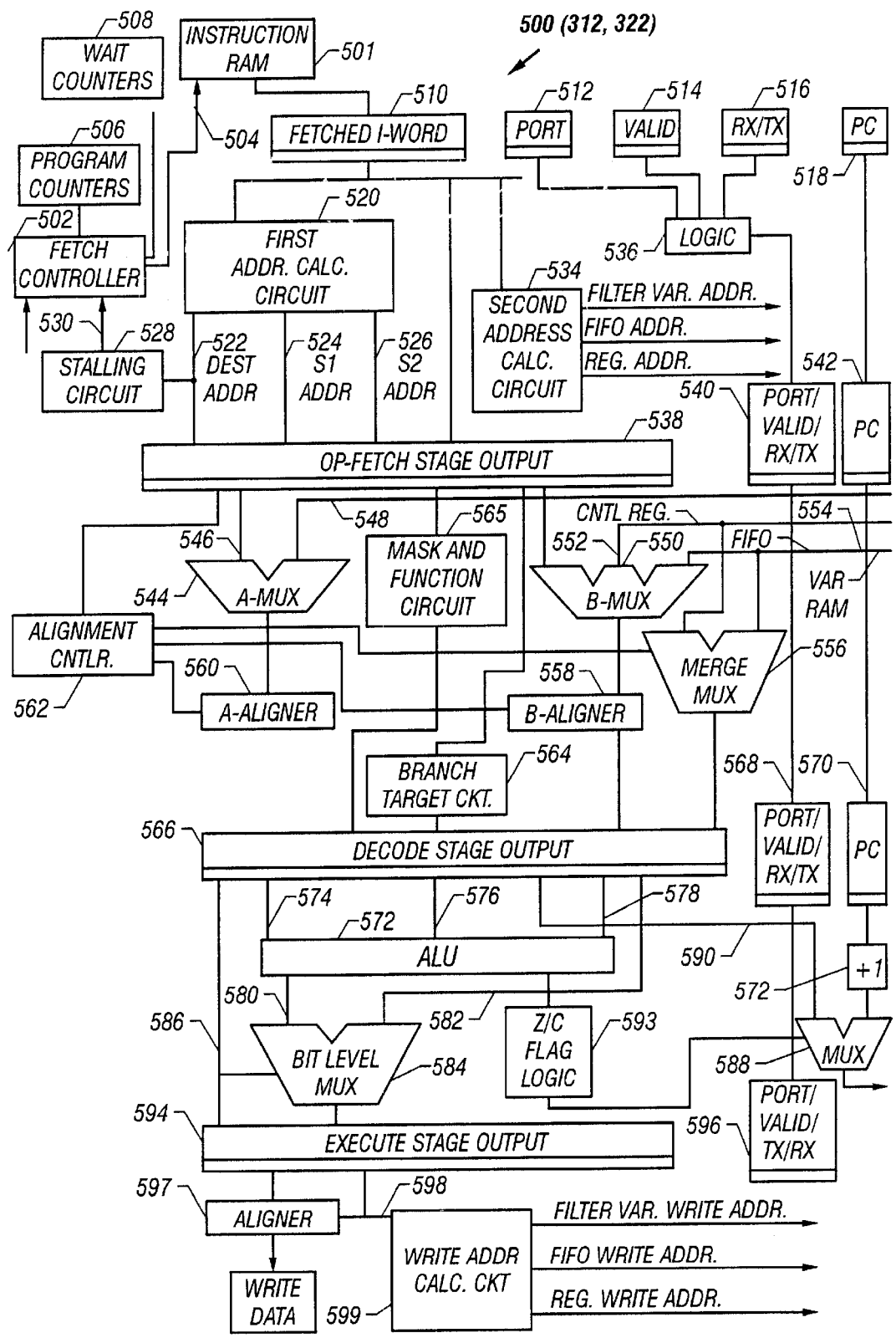
FIG. 5 is a block diagram of a filter processor according to another embodiment of the invention.

FIG. 5 is a block diagram of a filter processor 500 according to another embodiment of the invention. The filter processor 500 is a detailed embodiment of the filter processor 312 together with the instruction RAM 322 illustrated in FIG. 3. The filter processor 500 is also a more detailed embodiment of the filter processor 400. The filter processor 500 is a pipelined processor having five (5) stages. Generally, the stages are described as instruction fetch, operand fetch, decode, execute and write.

The filter processor 500 receives an instruction from an instruction RAM 501. The instruction RAM 501 is an internal 512×64 RAM that holds instruction words. Since the port number can be read from the filter variables RAM 318, execution specific to a port or group of ports can be supported. In one embodiment, protocol handlers share the same instruction set. The instruction RAM 501 is initialized by the microprocessor 228 at boot-up. While dynamic code changes are allowed, execution is preferably halted to prevent erroneous execution.

A fetch controller 502 produces an instruction select signal 504 that is used to select the appropriate instruction from the instruction RAM 501. The fetch controller 502 produces the instruction select signal 504 based on program counters 506 and weight counters 508. Specifically, the fetch controller 502 selects the appropriate instruction in accordance with the program counter 506 for the particular protocol handler 302 being processed in any given clock cycle and its associated wait counter 508. If the associated wait counter 506 is greater than zero, the pipeline executes transmit instructions retrieved from the instruction RAM 501. Otherwise, when the associated wait counter 506 is not greater than zero, the processing continues using the program counter for the particular protocol handler 302.

In any event, the operation of the fetch controller 502 is such that operates to switch its processing to each of the protocol handlers 302 with each clock cycle by selecting the program counter 506 for that protocol handler 302. In other words, the protocol handlers 302 are services by the filter processor 500 in a round robin fashion. Stated another way, each frame that is received or transmitted resets the context of the filter processor 500 for that port. For example, in the case in which the MAC circuitry 300 supports eight protocol handlers, the fetch controller 502 will sequence through each of the program counters 506 (one for each of the protocol handlers 302) to effectively service each the protocol handlers one clock cycle out of every eight clock cycles.

The first stage (fetch stage) of the filter processor 500 uses two clock cycles, and the remaining stages use a single clock cycle. The first stage requires two clocks to complete because the instruction RAM 501 contains an address register so that the first clock cycle selects one of eight (8) receive or transmit program counters and during the second clock cycle the appropriate instruction is read from the instruction RAM 501.

The appropriate instruction that is retrieved from the instruction RAM 501 is latched in a fetch instruction word (I-word) register 510. Additionally, a port number is latched in a port register 512, a valid indicator is latched in a valid register 514, receive/transmit indicator is stored in a receive/transmit register (RX/TX) 516, and a program counter is stored in a program counter register 518.

In a next stage of the filter processor 500, the operand fetch stage, a destination address, source-one (S1) address, and source-two (S2) address calculations are performed by a first address calculation circuit 520. Both S1 and S2 are obtained from an instruction, where S2 is an immediate value within the instruction format, and S2 includes a position in RX FIFO 310, a variable for a variable in the variable RAM 320 and a relative address adjustment within the instruction format. The first address calculation circuit 520 produces a destination address 522, a source-one address 524, and a source-two address 526, all of which are supplied to the next stage. The destination address 522 is also supplied to a stalling circuit 528 which produces a stall signal 530 that is supplied to the fetch controller 502. The stall signal 530 causes the pipeline to hold its current state until the stall condition is resolved. A carry-through link 532 carries through this stage other portions of data from the instruction that are needed in subsequent stages.

The operand fetch stage of the filter processor 500 also includes a second address calculation circuit 534 that calculates a filter variable address 554, a FIFO address 552, and a register address 548. The filter variable address 554 is supplied to a variable storage device, the FIFO address is supplied to a FIFO device, and the register address is supplied to a control register. As an example, with respect to FIG. 3, the variable storage device may be the filter variables RAM 318, the FIFO device may be the transmit and receive FIFOs 328, 310, and the control register may be within the framing logic 336.

The operand fetch stage generates write stage addresses. Technically, this stage requires two clock cycles to complete since data from the FIFOs 310, 328 and the filter variables RAM 318 due to address registers in the implementing RAMs. However, since instruction decoding by the decode stage is performed in parallel with the second clock of this stage, it is treated as requiring only a single clock cycle.

The operand fetch stage also includes logic 536 that combines the contents of the port register 512, the valid register 514 and the received/transmit register 516, and produces a combined context indicator. At the end of this stage, an operand-fetch stage register 538 stores the carry-through data 532 and the addresses produced by the first address calculation circuit 520. Also, the context indicator from the logic 536 is stored in a register 540 and the associated program counter is stored in the program counter register 542.

In the next stage, the decode stage, a multiplexer 544 (A-MUX) receives an immediate value 546 from the operand-fetch stage register 538 and possibly an operand 548 from the control register. Depending upon the type of instruction, the multiplexer 544 selects one of the immediate value 546 and the operand 548 as the output. A multiplexer 550 (B-MUX) receives the possibly retrieved operands from the control register, the FIFO device, and the variable RAM over links 548, 552, and 554. The multiplexer 550 selects one of these input operands as its output operand. The merge multiplexer 556 operates to merge the operands retrieved from the FIFO device and the variable RAM. Since the destination can be on any byte boundary, both operands are aligned to the destination to facilitate subsequent storage and processed data to a memory storage device. An aligner 558 (B-ALIGNER) aligns the output operand from the multiplexer 550, and an aligner 560 (A-ALIGNER) aligns the output from the multiplexer 544. An alignment controller 562 operates to control the merge multiplexer 556, the aligner 558, and the aligner 560 based on address signals from the operand-fetch stage register. A branch target circuit 564 operates to produce a branch target in certain cases. A decode stage register 566 stores the aligned values from the aligners 558 and 560, any mask or function produced by a mask and function circuit 565, the merged operand from the merge multiplexer 556, the branch target, and carry through data from the operand-fetch stage register 538. The accompanying context indicator is stored in the context register 568, and the accompanying program counter is stored in a program counter register 570.

In the next stage, the execution stage, an arithmetic logic unit (ALU) 572 receives input values 574, 576, and 578. The input value 574 is provided (via the decode stage register 566) by the aligner 560, the input value 576 is provided by the mask and function circuit 565, and the input value 578 is provided by the aligner 558. The ALU 572 produces an output value 580 the output value 580 based on the input values 574, 576 and 578. The output value 580 and a merged operand 582 (supplied via the merged multiplexer 556) are supplied to a bit level multiplexer 584 which outputs a masked output value. The bit level multiplexer 584 is controlled in accordance with the mask via link 586.

The execution stage includes a 64-bit ALU that can perform ADD, SUBTRACT, OR, XOR, and AND operations. The execution stage also generates Boolean outputs for comparison operations. In general, the program counter is written in this stage. The program counter is either incremented (no branch or branch not taken) or loaded (branch taken).

The execution stage also includes a multiplexer 588 that receives as inputs the branch target over a link 590 and the associated program counter after being incremented by one (1) by adder 592. The multiplexer 588 selects one of its inputs in accordance with a control signal produced by a zero/carry flag logic 593 that is coupled to the ALU 572 and the multiplexer 588. The mask (via the link 586) in the resulting value from the bit level multiplexer 584 are stored in an execute stage register 594. The context indicator is carried through this stage and stored in a context latch 596.

In the final stage, the write stage, of the filter processor 500, an aligner 597 aligns the masked output value from the ALU 572 to produce write data. The aligner 597 is controlled by the mask via a link 598. The link 598 also supplies the mask to a write address calculation circuit 599 that produces write addresses for the variable RAM, the FIFO devices, and the control register. The write stage then writes the write data 600 to one of the FIFOs 310, 328, filter variable RAM 318, or control registers.

The final result of receive frame processing is both the appropriate destination information for the frame as well as a copy/reject indication for the receiver layer of the protocol handler. In the case of token-ring, this information is used to set the AR & FC bits correctly. How quickly instructions execute affects both functions. On the system side, if instruction are still executing in order to forward the current frame, any following frame will fill into the receive FIFO 328 until up to 32 bytes. If the $32^{nd}$ byte is received before the previous frame finishes instruction execution the frame will be dropped automatically. For token-ring applications, the copy/reject decision should be completed by the time the FS is received The final result of transmit frame processing is deciding whether or not the frame should actually be transmitted on the wire or dropped. Additionally, for level-3 switching, transmit processing will replace the destination address (DA) with information from a translation table.

Up to 512 instructions may be used to process a frame. Instruction execution begins at address 0 for receive frames, and begins at a programmable address for transmit frames. Each instruction is capable of extracting fields from the frame and storing them in a 64 byte variable space. Likewise, frame fields can be compared against immediate values and the results of comparisons stored in variables. Lastly, fields can be extracted, looked up in a CAM and the CAM results stored in a variable. The microprocessor 228 can set port specific configuration parameters (VRING membership numbers, source routing ring and bridge numbers, etc.) in the variable memory as well.

In order to help instructions complete in time, execution is preferably scheduled as soon as the frame data on which an instruction depends arrives. Conversely, if an instruction requiring a data byte that has not yet been received attempts to execute, that instruction will be canceled. In many cases, this allows all required instructions to complete before or during the reception of the CRC.

Transmit side filtering will affect the minimum IPG the switch will be able to transmit with because the frame will have to be accumulated and held in the transmit FIFO 328 until processing has finished. Additionally, the transmit side filtering will be limited to the depth of the FIFO (128 bytes).

For space conscious implementations, transmit side filtering can be executed whenever receive instructions are not being executed. This should yield wire speed performance for any half-duplex medium. For more performance, a second execution pipeline together with another read port on the instruction RAM could be added.

Figure 6A:
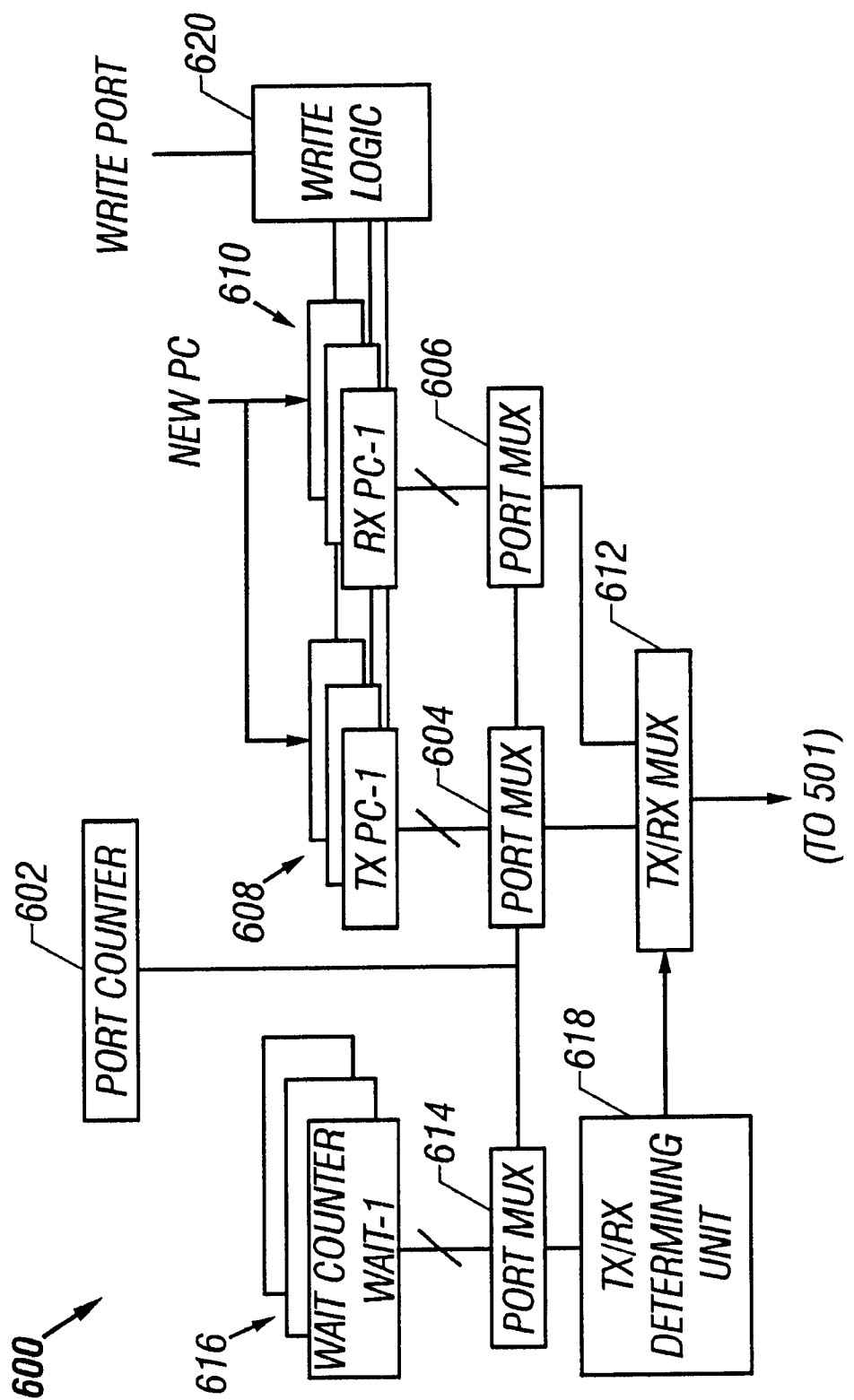
FIG. 6A is a block diagram of an instruction selection circuit according to an embodiment of the invention.

FIG. 6A is a block diagram of an instruction selection circuit 600 according to an embodiment of the invention. The instruction selection circuit 600 represents an implementation of the fetch controller 502, the program counters 506, and the wait counters 508 illustrated in FIG. 5.

The instruction selection circuit 600 includes a port counter 602 that increments a counter to correspond to the port number currently serviced by the filter processor 500. For example, if a frame processing apparatus is servicing eight (8) ports, then the port count repeatedly counts from zero (0) to seven (7). The port count produced by the port counter 602 is forwarded to a port multiplexers 604 and 606.

The port multiplexer 606 selects one of a plurality of transmitter program counters (Tx PC) 608 in accordance with the port count. The port multiplexer 606 selects one of a plurality of receive program counters (Rx PC) 610. The instruction selection circuit 600 includes one transmit program counter (Tx PC) and one receive program counters for each of the ports. A port multiplexer 606 selects one of the receive program counter (Rx PC) 610 in accordance with the port count supplied by the port counter 602. The output of the port multiplexers 604 and 606 are supplied to a transmit/receive multiplexer (Tx/Rx MUX) 612. The output of the transmit/receive multiplexer 612 is forwarded to the instruction RAM 501 to select the appropriate instruction for the particular port being serviced during a particular clock cycle. The transmit and receive program counter 608 and 610 also receive a new program count (NEW PC) from later stages of the filter processor 500 in the case in which the program counter for a particular port is altered due to a branch instruction or the like.

The instruction selection circuit 600 includes one counters (WAIT) 616 for each of the receive ports, and a port multiplexer 614 that selects one of the plurality wait counters (WAIT) 616 in accordance with the port count from the port counter 602. The particular wait counter 616 that is selected by the port multiplexer 614 is supplied to a transmit/receive determining unit 618. A transmit/receive determining unit 618 supplies a control signal to the transmit/receive multiplexer 612 such that the transmit/receive multiplexer 612 outputs the transmit program counter (Tx PC) when the selected wait counter is greater than zero (0), and otherwise outputs the receive program counter (Rx PC).

Figure 6B:
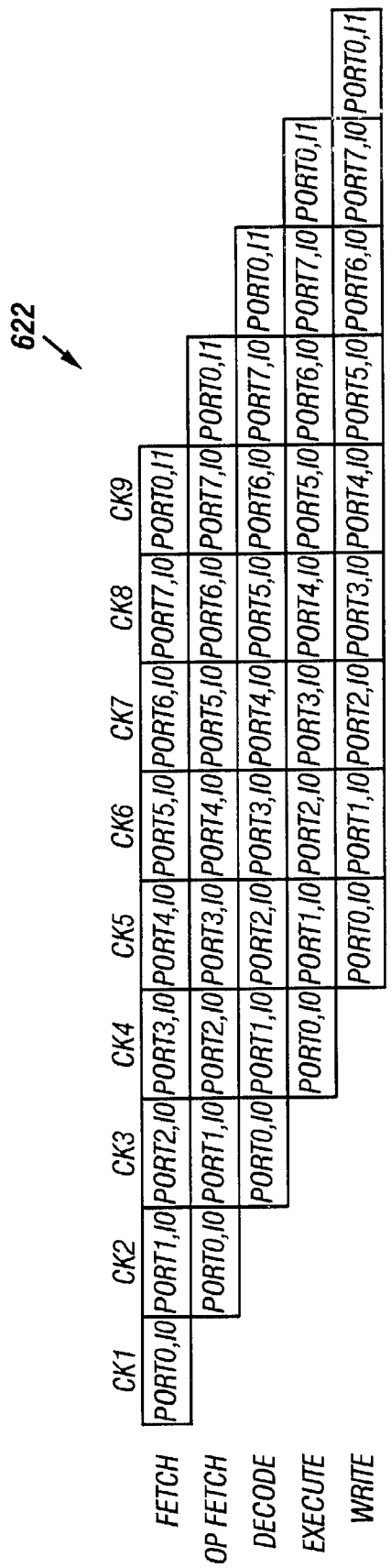
FIG. 6B is a diagram illustrating the context switching utilized by a filter processor according to the invention.

Accordingly, the instruction selection circuit 600 causes the processing for each port to switch context at each clock cycle, and to perform transmit processing only when an associated wait counter indicates that the receive processing must wait or when no receive processing is active. FIG. 6B is a diagram 622 illustrating the context switching utilized by a filter processor according to the invention. In particular, in the case of the filter processor 500 illustrated in FIG. 5, a five (5) stage pipeline operates to process instructions for each of the various ports. The allocation of the processing is performed on a round-robin basis for each port on each clock cycle. For example, as illustrated in the diagram 622 provided in FIG. 6B, the port number being incremented on each clock cycle (CK), and then the initial port is eventually returned to and the next instruction (whether for transmit or receive processing) for that port is then processed. By utilizing such a processing allocation technique, the pipeline of the filter processor 500 need not stall to wait for currently executing instructions to complete when there are dependencies with subsequent instructions for the same port. For example, in FIG. 6B, it is not until eight (8) clock cycles (CLK9) later that the next instruction (I1) is fetched by the filter processor for the port 0 which last processed an instruction (I0) during clock 1 (CLK1).

Figure 7:
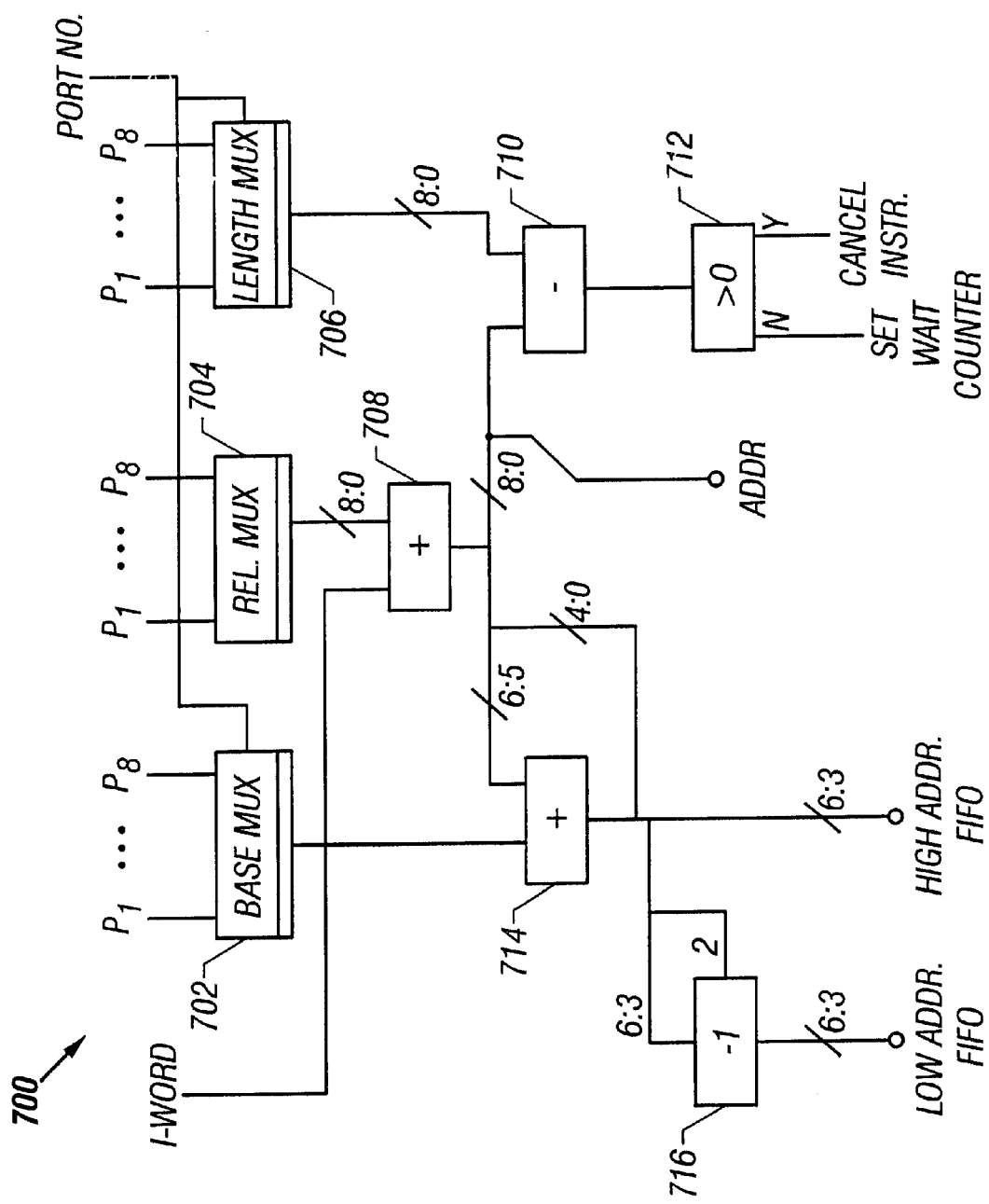
FIG. 7 is a block diagram of an address calculation circuit according to an embodiment of the invention.

FIG. 7 is a block diagram of an address calculation circuit 700 according to an embodiment of the invention. The address calculating circuit 700 performs most of the operations performed by the first address calculating circuit 520 and the second address calculating circuit 534 illustrated in FIG. 5.

The address calculation circuit 700 calculates the address of the operands in the storage devices (FIFOs, control registers, filter variables RAM). The address specified in the instruction being processed can be relative to a field in the frame (RIF or VLAN) and thus requires arithmetic operations. Additionally, the determined address must be checked against the current receive count for that port. If the requested data at that determined address has not yet arrived, the instruction must be canceled. Accordingly, the address calculation circuit 700 includes a base multiplexer 702 for outputting a base address for each of the ports, a relative multiplexer 704 for outputting a relative address for each of the ports, and a length multiplexer 706 for outputting a length of the frame. An adder 708 adds the relative address to a position provided in the instruction word (I-WORD) to produce an address for the storage device.

For FIFO locations, the address produced is compared against the write pointer for the port. A subtractor 710 implements the comparison by taking the result from the adder 708 and subtracts it from the length obtained from the length multiplexer 706. If the output of the subtractor 710 is greater than zero (0) then the instruction is canceled; otherwise, the appropriate wait counter is set. An adder 714 adds the base address from the base multiplexer 702 with the address produced (bits 5 and 6) from the adder 708. The resulting sum from the adder 714 produces a high address for the FIFO. The output from a decrementer device 716 causes a decrement operation to occur if bit 2 is zero (0). The output of the decrementer device 716, regardless of whether or not it decrements, is a low address value for the FIFO.

Figure 8:
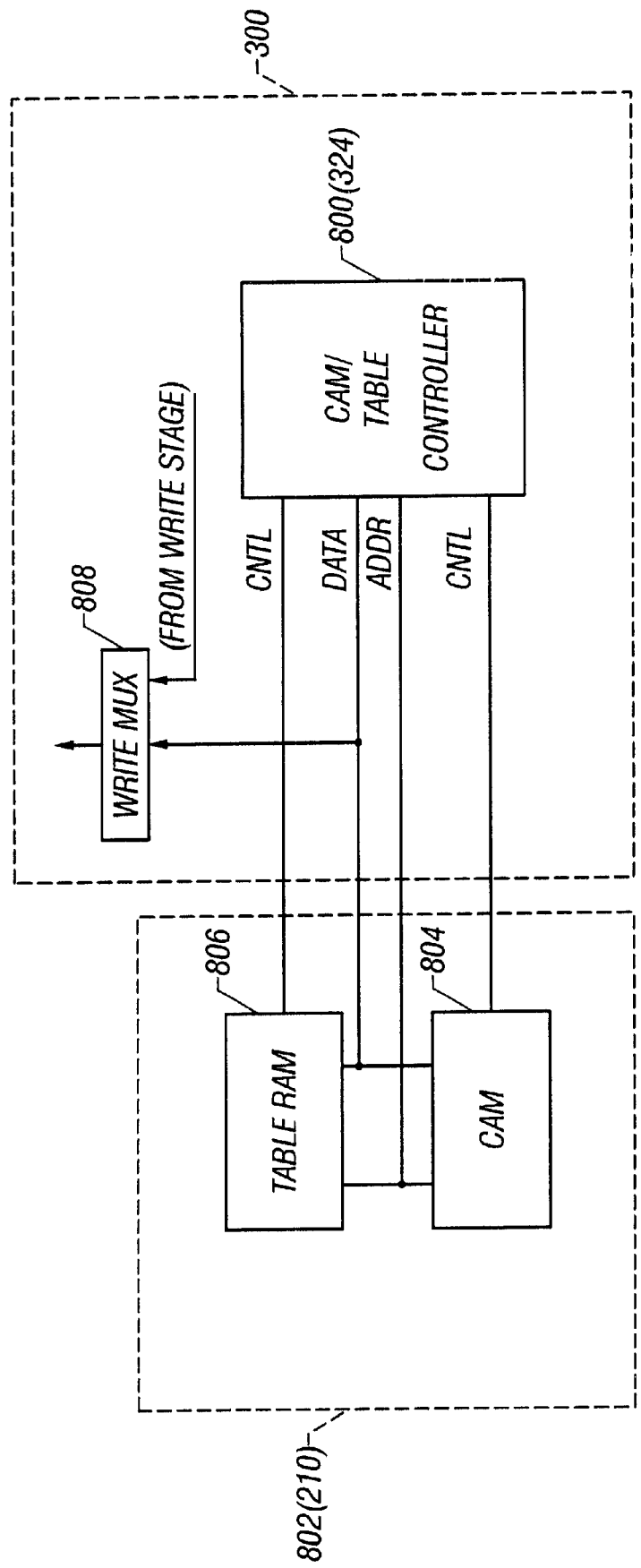
FIG. 8 is a block diagram of a CAM and a table RAM for implementing forwarding tables and associated interface circuitry illustrated in FIG. 2.

The forwarding tables 210 preferably includes an external table RAM and an external content-addressable memory (CAM). FIG. 8 is a block diagram of a CAM and a table RAM for implementing forwarding tables 210 and associated interface circuitry illustrated in FIG. 2. In particular, FIG. 8 illustrates forwarding tables 802 as including a CAM 804 and a table RAM 806. The MAC circuitry 300, or a portion thereof (e.g., the table interface 324), is coupled to the forwarding tables 802. The portion of the MAC circuitry 300 illustrated in FIG. 8 includes a CAM/table controller 800 that represents the table interface 324 illustrated in FIG. 3. The CAM/table controller 800 communicates with the CAM 804 and the table RAM 806 through a data bus (DATA) and an address bus (ADDR), and controls the CAM 804 and the table RAM 806 using control signals (CNTL). In addition, the MAC circuitry 300 preferably includes a write multiplexer 808 that outputs write data to be stored in one of the storage devices from either the data bus (DATA) coupling the CAM/table controller 800 with the CAM 804 and the table RAM 806 or the write data line of the write stage of the filter processor 500 illustrated in FIG. 5.

The frame processing apparatus 200 uses the CAM 804 for MAC level DA and SA processing as well as for RIF ring numbers and IP addresses. In addition, the table RAM 806 is used for destination information tables. In the case of multiple instances of the MAC circuitry 208, the CAM 804 and the table RAM 806 can be shared among the instances.

The CAM 804 is used to translate large fields to small ones for later use as a table index into the table RAM 806. In all cases, the address of the match is returned and used as a variable or table index. The benefit of using the CAM 804 is to preserve the associated data for performing wider matches. The table below summarizes typically occurring lookups:

| Match Word | Used For |
| --- | --- |
| 48 bit DA + 12 bit VRING/Bridge group | L2 frame destination determination |
| 48 bit SA | Address learning |
| 12 bit Destination Ring Number | Source route destination determination |
| 32 bit IP add. + 12 bit VRING/Bridge group | L3 frame destination determination |

Each lookup also includes a 2, 3, or 4 bit field that keys what type of data (e.g., MAC layer Addresses, IP Addresses) is being searched. This allows the CAM 804 to be used to store different types of information.

In all cases, the microprocessor 228 must carefully build destination tables cognizant of where data lands in the CAM 804 since match addresses are used as indexes as opposed to associated data. The size of a table entry is programmable but must be a power of 2 and at least 8 bytes (i.e., 8, 16, 32 bytes). The filter processor makes no assumptions on the contents of an entry. Rather, lookup instructions can specify that a given amount of data be transferred from the table to internal variables.

The table RAM 806 holds destination information for properly switching frames between ports. It also can include substitute VLAN information for transforming between tagged and untagged ports as well as MAC layer DA and RIF fields for layer-3 switching.

For the CAM 804 and the table RAM 806 to support multiple MAC circuitry 208 structures within the frame processing apparatus 200, each of the MAC circuitry 208 structures includes strapping options to specify master or slave operation. The master controls arbitration amongst all the MAC circuitry 208 structures for access to the CAM 804 and the table RAM 806. Additionally, the master supports access to the external memories (e.g., processor RAM 232) via the microprocessor 228. Alternately, the frame processing apparatus 200 could provide each of the MAC circuitry 208 structures its own CAM and table RAM, in which case the strapping options are not needed.

The CAM/table controller 800 accepts lookup requests from the pipeline of the filter processor and generates the appropriate cycles to the CAM 804. Multiple protocol handlers can share the single CAM 804. The pipeline of the filter processor 312 continues to execute while the CAM search is in progress. When the CAM cycle finishes, the result is automatically written into the filter variables RAM 318. No data dependencies are automatically checked. The filter processing software is responsible for proper synchronization (e.g., a status bit is available indicating lookup completion).

Figure 9:
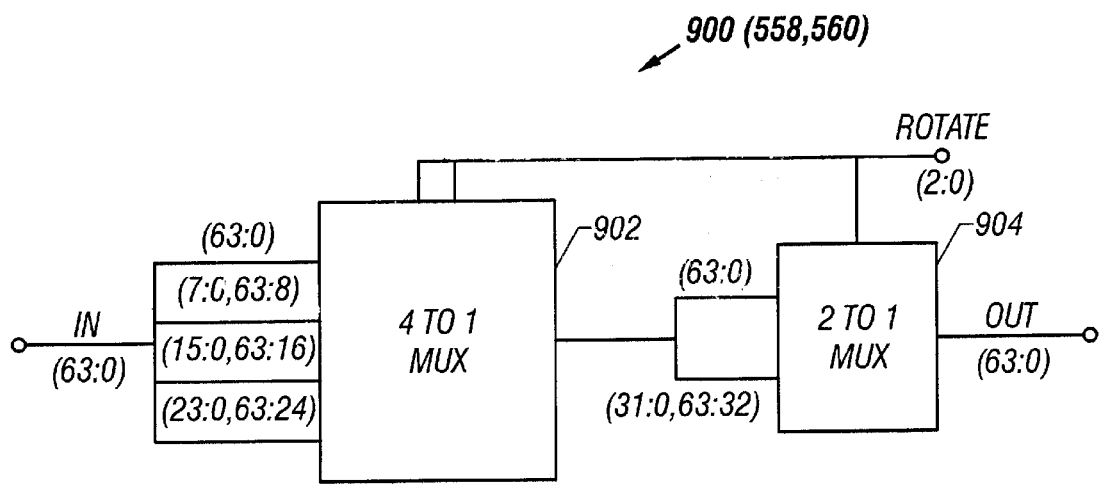
FIG. 9 is a block diagram of an aligner according to an embodiment of the invention.

FIG. 9 is a block diagram of an aligner 900 according to an embodiment of the invention. The aligner 900 represents an implementation of the aligners illustrated in FIG. 5, in particular the aligner 560. The aligner 900 includes a 4-to-1 multiplexer 902 and a 2-to-1 multiplexer 904. For example, upon receiving an input signal of 64 bits (63:0), the 4-to-1 multiplexer 902 receives four different alignments of the four bytes of the input signal. The selected alignment is determined by a rotate signal (ROTATE). Using the output from the 4-to-1 multiplexer 902, the 2-to-1 multiplexer receives two different alignments. One alignment is directly from the output of the 4-to-1 multiplexer 902, and the other alignment is rotated by two bytes. The 2-to-1 multiplexer 904 then produces an output signal (OUT) by selecting one of the two alignments in accordance with the rotate signal (ROTATE).

Figure 10:
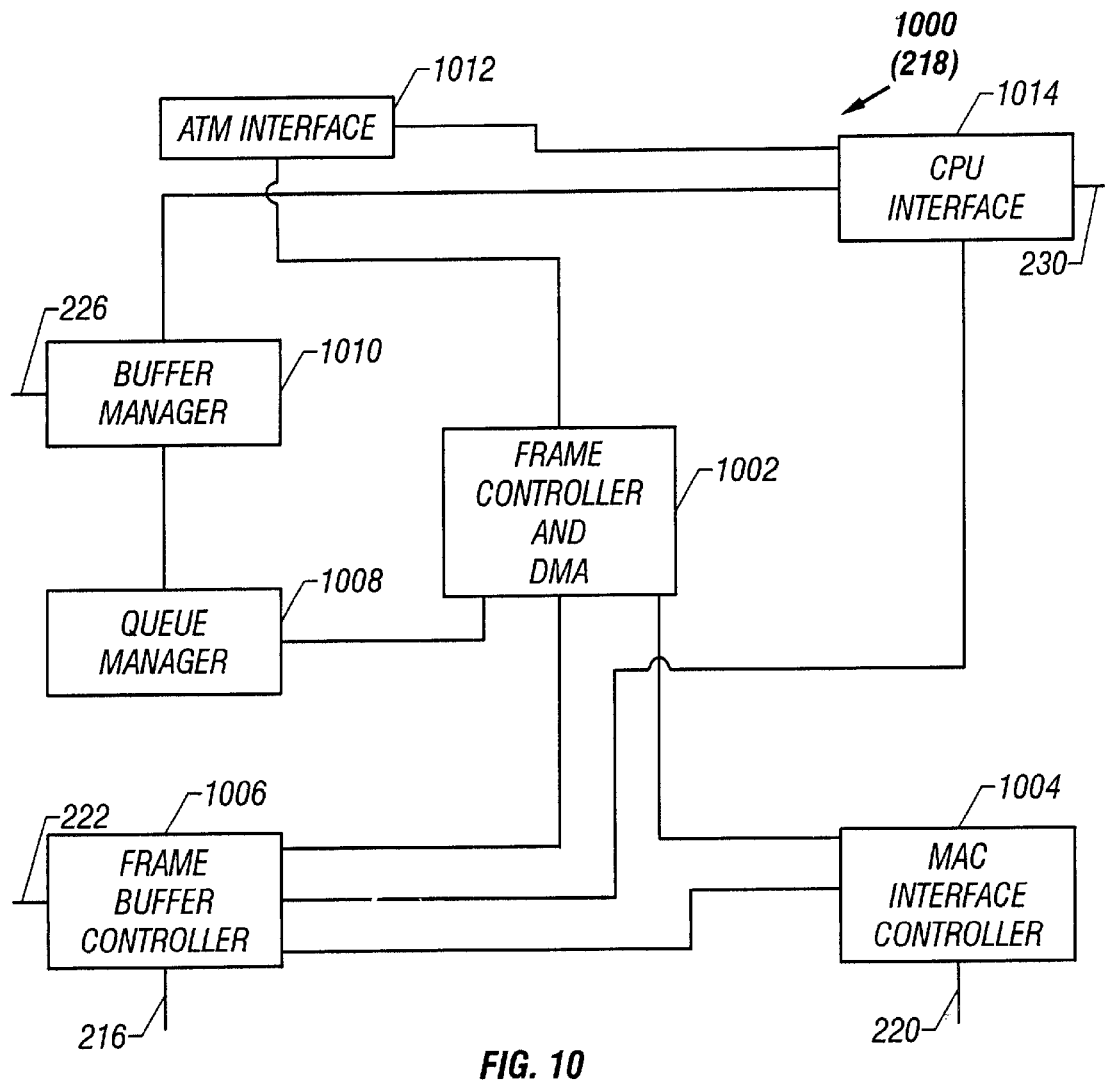
FIG. 10 is a block diagram of a switching circuit.

FIG. 10 is a block diagram of a switching circuit 1000. The switching circuit 1000 is a more detailed diagram of the switch circuitry 218 of FIG. 2. The switching circuit 1000 includes a frame controller and DMA unit 1002, a MAC interface controller 1004, a frame buffer controller 1006, a queue manager 1008, a buffer manager 1010, an ATM interface 1012, and a CPU interface 1014. The frame controller and DMA unit 1002 controls the overall management of the switching operation. The queue manager 1008 and the buffer manager 1020 respectively manage the queues and buffers of the output queues and buffer management information storage 224 via the bus 226. The frame buffer controller 1006 couples to the data bus 216 for receiving incoming data frames as well as outgoing data frames. The frame buffer controller 1006 stores and retrieves the data frames to the frame buffer 214 via the bus 222. The MAC interface controller 1004 communicates with the MAC circuitry 208 via the control bus 220 to determine when frames are to be received to or removed from the frame buffer 214. The ATM interface couples to the ATM port 227 to receive data from or supply data to the ATM port 227. The data received from the ATM port is stored to the frame buffer 214 in the same manner as other frames, though the data bus 216 is not used. The CPU interface 1014 enables the microprocessor 228 to interact with the output queues and buffer management information storage 224, the frame buffer 214, and the ATM interface 1012. Attached hereto as part of this document is Appendix A containing additional information on exemplary instruction formats and instructions that are suitable for use by a filter processor according to the invention.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus for filtering data frames of a data communications network, said apparatus comprising:

a pipelined processor to filter the data frames;

a filter memory coupled to said pipelined processor, said filter memory being configured to provide (i) a first set of filter variables to said pipelined processor for performing filtering operations on data frames received by the apparatus and (ii) a second set of filter variables to said pipelined processor for performing filtering operations on data frames being transmitted;

a framing logic coupled to said pipelined processor, said framing logic being configured to control reception and transmission of the data frames; and a transmit circuit coupled to the framing logic and configured to transmit high priority frames prior to other data frames;

a receive buffer configured to temporarily store data received from said plurality of protocol handlers;

a plurality of protocol handlers, coupled to the pipelined processor and coupled to the transmit circuit to receive data frames from the pipelined processor and the transmit circuit and transmit the data frames;

a multiplexer having an output coupled to said receive buffer and a plurality of inputs corresponding to said protocol handlers; and a transmit buffer configured to temporarily store data for transmission through at least one of said protocol handlers.

2. The apparatus as recited in claim 1, further comprising a table interface coupled to said pipelined processor, the table interface being configured to upload address information used by said filter processor to process the data frames.

3. The apparatus as recited in claim 2, wherein said table interface includes a controller in communication with a content addressable memory (CAM) and a random access memory.

4. The apparatus as recited in claim 1, wherein the data communications network includes a token-ring network and the data frames have a token-ring format.

5. The apparatus as recited in claim 1, wherein the data communications network includes an ethernet network and the data frames have an ethernet format.

6. The apparatus as recited in claim 1, wherein said pipelined processor operates in accordance with a clock cycle, and provides a uniform latency to data frames received at said protocol handlers by sequencing through said protocol handlers with each clock cycle.

7. The apparatus as recited in claim 1, wherein said pipelined processor comprises:
an instruction fetch stage to retrieve an instruction for processing a data frame from one of said protocol handlers;
an operand fetch stage to fetch at least one operand associated with the instruction;
a decode stage to decode the instruction;
an execute stage to execute the decoded instruction in accordance with at least one of the instruction and the at least one operand to produce a filter result; and
a write stage to write the filter result to a memory device.

8. The apparatus as recited in claim 1 further comprising:

a controller coupled to said pipelined processor, said framing logic, said receive buffer and said transmit buffer, said controller being configured to control loading and unloading of data from the receive buffer and the transmit buffer.

9. An integrated circuit, comprising:

a plurality of protocol handlers;

a receive buffer coupled to said plurality of protocol handlers, said receive buffer being configured to temporarily store data received from said protocol handlers;

a framing logic coupled to said plurality of protocol handlers, said framing logic being configured to control the reception and transmission of data frames via said protocol handlers;

a filter processor, coupled to the receive buffer, and configured to filter the data frames received by said protocol handlers such that certain of the data frames are dropped and other data frames are provided with at least one switching destination, whereby said receive buffer, said framing logic and said filter processor process the data frames to be transmitted as well as the data frames received from said protocol handlers, said filter processor is further configured to determine and is set an address recognized (AR) value and a frame copied value (FC) in the data frames received; and a transmit circuit coupled to the protocol handlers and configured to transmit high priority frames prior to other data frames over the protocol handlers.

10. The integrated circuit as recited in claim 9, wherein said integrated circuit is a media access controller for transmission media coupled to said protocol handlers.

11. The integrated circuit as recited in claim 9, wherein said filter processor is a pipelined processor configured to (i) filter the data frames received by said protocol handlers, and (ii) to provide a uniform latency by sequencing through said protocol handlers with each clock cycle.

12. An integrated circuit as recited in claim 9, wherein said integrated circuit further comprises:

a transmit buffer for temporarily storing outgoing data to be supplied to said protocol handlers, and wherein said filter processor further operates to filter the data frames being supplied to said protocol handlers for transmission.

13. The integrated circuit of claim 9, further comprising:

a statistics memory operatively coupled to the framing logic to store counters to support at least Simple Network Management Protocol (SNMP) operations.

14. A system comprising:

a plurality of protocol handlers corresponding to at least one communication port;

a filter processor coupled to the plurality of protocol handlers to filter data frames;

a framing logic coupled to the filter processor to transmit control information and coupled to the plurality of protocol handlers to control the reception and transmission of data frames via the protocol handlers;

a transmit buffer coupled to the filter processor and the plurality of protocol handlers and configured to temporarily store data to be transmitted to the protocol handlers;

a transmit circuit coupled to the plurality of protocol handlers and configured to transmit high priority frames prior to data frames currently queued at the transmit buffer for transmission over the protocol handlers;

a filter memory coupled to the filter processor and configured to provide (i) a first set of filter variables to the filter processor for performing filtering operations on data frames received by the system and (ii) a second set of filter variables to the filter processor for performing filtering operations on data frames being transmitted; and a receive buffer coupled to the plurality of protocol handlers and configured to temporarily store data received from the protocol handlers.

* * * * *